US012640955B1

(12) United States Patent
Kakrania et al.

(10) Patent No.: US 12,640,955 B1
(45) Date of Patent: May 26, 2026

(54) AVOIDING UNWANTED DUPLICATION AND/OR FLOODING FOR LAYER 2 UNKNOWN UNICAST AND/OR LAYER 2 INTERNET PROTOCOL (IP) MULTICAST (BUM) TRAFFIC, FOR EXAMPLE, IN DEVICES USED IN VXLAN DATA CENTERS AND DATA CENTER INTERCONNECTS

(71) Applicant: Juniper Networks, Inc., Sunnyvale, CA (US)

(72) Inventors: Deepak Kakrania, Bangalore (IN); Suraj Kumar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 139 days.

(21) Appl. No.: 18/777,060

(22) Filed: Jul. 18, 2024

(51) Int. Cl.
| | |
|---|---|
| *H04L 12/18* | (2006.01) |
| *H04L 12/46* | (2006.01) |
| *H04L 45/00* | (2022.01) |
| *H04L 45/745* | (2022.01) |

(52) U.S. Cl.
CPC ...... *H04L 12/1886* (2013.01); *H04L 12/4633* (2013.01); *H04L 45/66* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 8,891,535 | B2 * | 11/2014 | Angst | H04L 49/201 |
| | | | | 709/242 |
| 9,602,435 | B2 * | 3/2017 | Yedavalli | H04L 61/103 |
| 9,794,180 | B2 * | 10/2017 | Thoria | H04L 45/32 |
| 10,469,529 | B2 * | 11/2019 | Qu | H04L 61/5007 |
| 10,476,850 | B2 * | 11/2019 | Pillai | H04L 45/16 |
| 10,924,407 | B2 * | 2/2021 | Helén | H04L 45/32 |
| 10,999,195 | B1 * | 5/2021 | Suryanarayana | H04L 12/4633 |
| 2014/0192806 | A1 * | 7/2014 | Yadav | H04L 12/1868 |
| | | | | 370/390 |

* cited by examiner

*Primary Examiner* — Backhean Tiv
(74) *Attorney, Agent, or Firm* — Hewlett Packard Enterprise Patent Department

(57) ABSTRACT

The forwarding of BUM traffic in routers and/or switches (e.g., in environments such as interconnected L2 broadcast domains, such as DCs and DCIs with a VXLAN overlay) is improved so that BUM traffic is properly forward, but with reduced (e.g., eliminated) unnecessary duplication and/or flooding.

20 Claims, 17 Drawing Sheets

FIGURE 2A
(Prior Art)

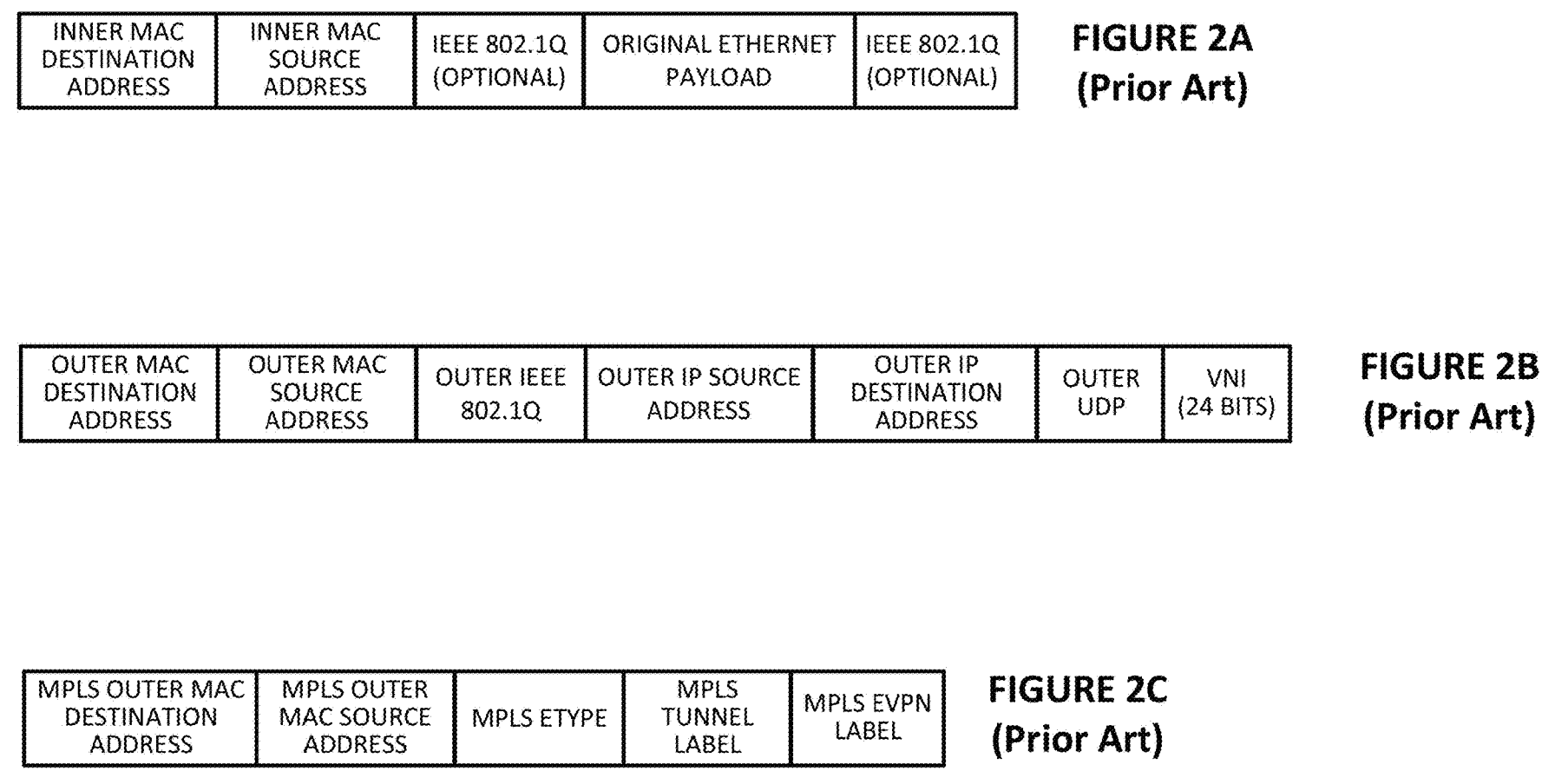

| INNER MAC DESTINATION ADDRESS | INNER MAC SOURCE ADDRESS | IEEE 802.1Q (OPTIONAL) | ORIGINAL ETHERNET PAYLOAD | IEEE 802.1Q (OPTIONAL) |

FIGURE 2B
(Prior Art)

| OUTER MAC DESTINATION ADDRESS | OUTER MAC SOURCE ADDRESS | OUTER IEEE 802.1Q | OUTER IP SOURCE ADDRESS | OUTER IP DESTINATION ADDRESS | OUTER UDP | VNI (24 BITS) |

FIGURE 2C
(Prior Art)

| MPLS OUTER MAC DESTINATION ADDRESS | MPLS OUTER MAC SOURCE ADDRESS | MPLS ETYPE | MPLS TUNNEL LABEL | MPLS EVPN LABEL |

300

FORWARDING RULES

| BUM BIT | MAC/IP MULTICAST LOOKUP | BD TYPE | BD ROLL | FORWARDING ACTION |
|---------|-------------------------|---------|---------|-------------------|
| 1 | 1 | DCI | DF | L2 FORWARDING (BASED ON LOOKUP RESULT) |
| 1 | 1 | DCI | NON-DF | FLOOD IN BD |
| 1 | 0 | DCI | X | FLOOD IN BD |
| 1 | X | NON-DCI | X | FLOOD IN BD |

FIGURE 12

AVOIDING UNWANTED DUPLICATION AND/OR FLOODING FOR LAYER 2 UNKNOWN UNICAST AND/OR LAYER 2 INTERNET PROTOCOL (IP) MULTICAST (BUM) TRAFFIC, FOR EXAMPLE, IN DEVICES USED IN VXLAN DATA CENTERS AND DATA CENTER INTERCONNECTS

§ 1. BACKGROUND OF THE INVENTION § 1.1 FIELD OF THE INVENTION

The present application concerns communications networks. More specially, the present application concerns challenges encountered when forwarding broadcast, unknown unicast, or multicast (BUM) traffic, especially in the context of certain broadcast domains (BDs) such as, for example, data centers (DCs) and data center interconnects (DCIs).

§ 1.2 BACKGROUND INFORMATION

Please note that the disclosure in this section is not an admission of prior art.

Although data centers, data center interconnects, Ethernet Virtual Private Networks (EVPNs) and Virtual Extensible Local Area Networks (VXLANs) are understood by those skilled in the art, they are introduced here for the reader's convenience.

§ 1.2.1 EVPN WITH VXLAN DATA PLANE ENCAPSULATION

Ethernet VPNs (EVPNs) enable service providers to connect groups of dispersed customer sites using Layer 2 virtual bridges. Virtual Extensible LANs (VXLANs) allow service providers to stretch Layer 2 connectivity over an intervening Layer 3 network, while providing network segmentation like a VLAN, but without scaling limitations of traditional VLANs.

EVPN with VXLAN encapsulation handles Layer 2 connectivity at the scale required by cloud server providers and may be used to replace limiting protocols like Spanning Tree Protocol (STP), freeing up the Layer 3 network to use more robust routing protocols.

Although they are understood by those skilled in the art, virtual private networks (VPNs), such as EVPNs, VXLANs, and the integration of EVPNs and VXLANs are introduced below.

§ 1.2.1.1 VIRTUAL PRIVATE NETWORKS (VPNs)

EVPN is a standards-based technology (See, e.g., A. Sajassi, Ed., "BGP MPLS-Based Ethernet VPN," Request for Comments: 7432 (Internet Engineering Task Force, February 2015), incorporated herein by reference.) that provides virtual multipoint bridged connectivity between different Layer 2 domains over an Internet Protocol (IP) or Internet Protocol/Multiprotocol Label Switching (IP/MPLS) backbone network. Like other VPN technologies, such as IP VPN and virtual private LAN service (VPLS), EVPN instances are configured on provider edge (PE) routers to maintain logical service separation between customers. The PE routers connect to customer edge (CE) devices, which can be routers, switches, hosts, etc. The PE routers then exchange reachability information using Multiprotocol Border Gateway Protocol (MP-BGP). Encapsulated traffic is forwarded between PE routers. The EVPN architecture shares some common elements with other VPN technologies. This makes it easier to seamlessly introduce and integrate an EVPN into existing service environments.

FIG. 1 illustrates an example of a conventional network topology 100 in which an EVPN provides a transport service to customers via customer edge devices CE 1 and CE 2. The example EVPN includes provider edge devices PE 1, PE 2 and PE 3, as well as a border gateway protocol (BGP) route reflector. Control plane learning may occur within the EVPN among the provider edge devices (PEs). Data plane learning may occur between customer edge devices (CEs) and provider edge devices (PEs). CE 1 is said to be multi-homed to the EVPN via PE 1 and PE 2. The two links, which may be part of a link aggregation group (LAG) may be thought of as a common Ethernet segment (ES), which is identified by the Ethernet segment identifier (ESI) 00:11:22:33:44:55:66:77:88:99. The provider edge devices PE 1, PE 2 and PE 3 belong to the same EVPN instance (EVI).

The EVPN is often used as a Layer 2 overlay solution to provide Layer 2 connection over an IP underlay for the endpoints within a virtual network whenever Layer 2 connectivity is required by an end station such as bare-metal server (BMS). Otherwise, Layer 3 routing is used, for example, through virtual routing and forwarding (VRF) tables. Advantageously, EVPN technology offers multi-tenancy, flexible services that can be extended on demand, frequently using compute resources of different physical data centers for a single service (Layer 2 extension).

EVPN's MP-BGP control plane enables service providers to dynamically move live virtual machines (VMs) from one data center to another (also known as "virtual machine (VM) motion". After a VM is moved to a destination server or "hypervisor" (that is, a program used to run and manage VMs on a computer(s)), it transmits a gratuitous address resolution protocol (ARP), which updates the Layer 2 forwarding table of the PE device at the destination data center. The PE device then transmits a MAC route update (e.g., via a Type 2 advertisement) to all remote PE devices which, in turn, update their forwarding tables. An EVPN tracks the movement of the VM, which is also known as MAC mobility.

EVPN also has mechanisms that detect and stop MAC flapping, and prevent the looping of broadcast, unknown unicast, and multicast (BUM) traffic in an all-active multi-homed topology.

The EVPN technology, similar to Layer 3 multiprotocol label switching (MPLS) VPNs, includes the concept of routing MAC addresses using an IP/MPLS core. EVPN provides benefits, such as, the ability to have an active multihomed edge device, aliasing, fast convergence, load balancing of traffic across dual-active links, MAC address mobility, and multitenancy. In addition, EVPN can use techniques such as multihoming, split horizon, local link bias, and EVPN with VXLAN encapsulation (or tunneling). Each of these techniques is introduced below.

Multihoming is used to provide redundancy in the event that an access link or one of the PE routing devices to which a CE device is connected, fails. In either case, traffic flows from the CE device towards the PE router using one or more remaining active links. For traffic in the other direction, the remote PE router updates its forwarding table to send traffic to the remaining active PE router(s) connected to the multihomed Ethernet segment (ES). EVPN provides a fast convergence mechanism, which reduces traffic restoration time so that the time it takes to make this adjustment is independent of the number of media access control (MAC)

addresses learned by the PE router. "All-active" multihoming enables a CE device to connect to two or more PE routers such that traffic may be forwarded using all of the links between the devices. (Recall, for example, CE 1, PE 1 and PE 2 of FIG. 1.) This multihoming enables the CE device to load-balance traffic to multiple PE routers. Further, multihoming enables a remote PE router to load-balance traffic to the multihomed PE routers across the core network. This load balancing of traffic flows between data centers is known as aliasing, which causes different signals to become indistinguishable (that is, they become "aliases" of one another).

Split horizon prevents the looping of BUM traffic in a network. The split horizon basic principle is simple—information about the routing for a particular packet is never sent back in the direction from which it was received.

Local bias conserves bandwidth by using local links to forward unicast traffic exiting a Virtual Chassis or Virtual Chassis Fabric (VCF) that has a link aggregation group (LAG) bundle composed of member links on different member switches in the same Virtual Chassis or VCF. A local link is a member link in the LAG bundle that is on the member switch that received the traffic.

EVPN with VXLAN encapsulation is used for Layer 2 connectivity between virtual machines and a top-of-rack (TOR) switch within a Layer 2 domain. Certain routers can be used as a Layer 2 or Layer 3 VXLAN gateway (GW).

§ 1.2.1.2 VIRTUAL EXTENSIBLE LOCAL AREA NETWORKS (VXLANs)

VXLANs can be used to provide an "overlay" scheme that expands the Layer 2 network address space from about 4,000 to 16 million, largely solving the scaling issues seen in VLAN-based environments. Network overlays are created by encapsulating traffic and tunneling the traffic over a physical network. A number of different tunneling protocols may be used to create network overlays. The most common protocol in the context of data centers is presently VXLAN. VXLAN tunneling protocol encapsulates Layer 2 Ethernet frames (See, e.g., FIG. 2A.) in Layer 3 UDP packets. This encapsulation enables service providers to create virtual Layer 2 subnets or segments that can span physical Layer 3 networks.

In a VXLAN overlay network, a VXLAN network identifier (VNI) uniquely identifies each Layer 2 subnet or segment. A VNI segments traffic the same way that an IEEE 802.1Q VLAN ID segments traffic. As is the case with VLAN, virtual machines on the same VNI can communicate directly with each other, whereas virtual machines on different VNIs need a router to communicate with each other.

The entity that performs the encapsulation and de-encapsulation is called a VXLAN tunnel endpoint (VTEP). In the physical network, a device that functions as a Layer 2 or Layer 3 VXLAN gateway can encapsulate and de-encapsulate data packets. This type of VTEP is known as a "hardware VTEP." In the virtual network, VTEPs can reside in hypervisor hosts, such as kernel-based virtual machine (KVM) hosts. This type of VTEP is known as a "software VTEP."

Each VTEP has two interfaces. A first of the two interfaces is a switching interface that faces the virtual machines in the host and provides communication between VMs on the local LAN segment. A second of the two interfaces is an IP interface that faces the Layer 3 network.

Each VTEP has a unique IP address that is used for routing the UDP packets between VTEPs. For example, when a first VTEP (VTEP1) receives an Ethernet frame (Recall, e.g., FIG. 2A.) from VM1 addressed to VM3, it uses the VNI and the destination MAC to look up in its forwarding table which VTEP (in this example, a second VTEP (VTEP2)) it will send the packet to. It then adds a VXLAN header (See, e.g., FIG. 2B.) that contains the VNI to the Ethernet frame, encapsulates the frame in a Layer 3 UDP packet, and routes the packet to VTEP2 over the Layer 3 network. VTEP2 de-encapsulates the original Ethernet frame and forwards it to VM3. VM1 and VM3 cannot detect the VXLAN tunnel and the Layer 3 network between them. That is, the VXLAN tunnel acts as a "transparent" LAN segment. For comparison, FIG. 2C illustrates a packet header in an MPLS network.

§ 1.2.1.3 EVPN-VXLAN INTEGRATION OVERVIEW

VXLAN defines a tunneling scheme to overlay Layer 2 networks on top of Layer 3 networks. This tunneling scheme allows for optimal forwarding of Ethernet frames with support for multipathing of unicast and multicast traffic with the use of UDP/IP encapsulation for tunneling, and is mainly used for the intra-data center site connectivity.

Referring to the example network topology 300 of FIG. 3, one characteristic of EVP is that MAC address learning between PE routers (PE1-PE4) occurs in the control plane. Responsive to a local PE router detecting a new MAC address from a CE device, it advertises (e.g., using MP-BGP) the address to all the remote PE routers. This method differs from existing Layer 2 VPN solutions such as VPLS, which learn by flooding unknown unicast in the data plane. This control plane MAC learning enables many benefits provided by EVPN. For example, since MAC learning is handled in the control plane, EVPN has the flexibility to support different data plane encapsulation technologies between PE routers. This flexibility is beneficial because not all backbone networks run MPLS, especially in enterprise networks.

EVPN addresses many of the challenges faced by network operators building data centers (DCs) to offer cloud and virtualization services. The main application of EVPN is Data Center Interconnect (DCI), which refers to the ability to extend Layer 2 connectivity between different data centers that are deployed to improve the performance of delivering application traffic to end users and for disaster recovery. Although various DCI technologies are available, EVPN has advantages (such as active/active redundancy, aliasing, and mass MAC withdrawal) over other MPLS technologies. Consequently, it is useful to integrate VXLAN with EVPN to provide DCI.

As shown in FIG. 3, an EVPN is used as an interconnect to connect a VXLAN at data center site 1 and another VXLAN at data center site 2. Data center site 1 includes a top of rack (TOR) 1 coupled with servers identified by VLAN 1, MAC 1 and VLAN 2, MAC 2. Similarly, data center site 2 includes TOR 2 couple with servers identified by VLAN 1, MAC 11 and VLAN 2, MAC 12. Provider edge devices PE1 and PE2 of the EVPN act as gateways (GWs) between the EVPN and the VXLAN at data center site 1, while PE3 and PE4 of the EVPN act as gateways between the EVPN and the VXLAN at data center cite 2. A first VXLAN tunnel between TOR 1 and PE2 and between TOR 2 and PE4 is extended by an EVPN tunnel between PE2 and PE4. Similarly, a second VXLAN tunnel between TOR 1 and PE1 and between TOR 2 and PE3 is extended by an EVPN tunnel between PE1 and PE3. Each VXLAN, which is connected to the MPLS or IP core, runs an independent instance of the interior gateway protocol (IGP) control plane. Each PE router participates in the IGP control plane instance of its VXLAN. In this example, each customer is a data center, so each has its own virtual router for VXLAN underlay. In this example, the VXLAN broadcast domain (BD) is stretched via EVPN-MPLS (EVPN-VXLA-N←→EVPN-MPLS←→EVPN-VXLAN). In some examples described below, the VXLAN BD is stretched via EVPN-VXLAN (EVPN-VXLAN←→EVPN-VXLA-N←→EVPN-VXLAN.

Each PE node can terminate the VXLAN data plane encapsulation where the VXLAN network identifier (VNI) is mapped to a bridge domain or VLAN. The PE router performs data plane learning on the traffic received from the VXLAN.

Each PE node implements EVPN to distribute the client MAC addresses learned over the VXLAN tunnel into BGP. Each PE node encapsulates the VXLAN or Ethernet frames with MPLS when sending the packets over the MPLS core and with the VXLAN tunnel header when sending the packets over the VXLAN network.

§ 1.2.2 PROBLEMS OF UNWANTED DUPLICATION AND EXCESSIVE FLOODING OF BUM TRAFFIC IN VXLAN DCs AND DCIs

FIG. 4 illustrates an example environment 400 in which example embodiments consistent with the present description may be used to avoid unwanted duplication and/or to reduce (e.g., eliminate) excessive flooding of BUM traffic. In the following, the terms broadcast domain (BD) role and BD type are used. A BD role is either designated forwarder (DF), or non-DF. A BD type is either DCI, or non-DCI (wherein BD type is DCI if that BD is used to interconnect DCs, and otherwise, non-DCI).

Assume that there are no direct VXLAN tunnels between the top-of-rack devices (TORs) of different DCs. Instead, TORs of different DCs are reached through their respective GWs.

The number of VXLAN tunnels on each TOR is the order of number of TORs and local gateways (GWs) in a DC. Table 1 below lists different virtual tunnel endpoints (VTEPs) of various VXLAN tunnels in DC1 and in the DCI. DC2 will have similar, corresponding, VXLAN tunnels.

ing table(s) (sometimes referred to as "forwarding table(s)" for brevity) and, based on the result, GW11 or GW12 encapsulates the packet in another VXLAN packet and tunnels it to either GW21 or GW22 in DC2. (See, e.g., the endpoints in the GW11 or GW 12 row in Table 1 above.) This is done within the DCI.

Next GW21 or GW22 decapsulates the received VXLAN packet. GW21 or GW22 performs a MAC/IP lookup on its forwarding table(s). Based on the lookup result, GW21 or GW22 encapsulates the packet in yet another VXLAN packet and tunnels it to TOR21. This is done within DC2. Finally, TOR21 decapsulates the VXLAN packet, performs a MAC/IP lookup on its forwarding table(s), and, based on the table lookup result, sends the packet to H2.

The foregoing example assumed that each of TOR11, GW11 or GW12, GW21 or GW22, and TOR21 had entries in their respective forwarding tables matching the MAC destination address/IP Multicast address in the packet. This may be referred to as a "known unicast" "known IP multicast" case. If the forwarding device has a forwarding table entry for a MAC destination address/Multicast IP address in the header of a received packet, this is referred to as a lookup "hit," otherwise, there is a lookup "miss." More specifically, the data forwarding device (router/switch) has two forwarding tables for a given broadcast domain (BD)—(1) a MAC forwarding table, and (2) an IP multicast forwarding table. In the MAC forwarding table, the lookup key is <BD, Destination MAC address> and output data is outgoing <port/VTEP>. In the IP multicast forwarding table, the lookup key is <BD, IP (multicast)> and output data is a list of L2 receivers <ports and VTEPs>. When MAC address is learned in a BD (e.g., via the address resolution protocol (ARP)), a corresponding entry is added to the MAC forwarding table. When IGMP Internet Group Management Protocol and/or Multicast Listener Discovery (IGMP/MLD) snooping is enabled on a BD and joins are received in the BD, entries are added in IP multicast forwarding table. Generic rule(s) for the packet forwarding in a BD are as follows. If IGMP/MLD snooping is not enabled on a BD, lookup happens based on the packet's destination MAC address. If an entry is found (i.e., lookup hit), the packet is forwarded to the <port/VTEP> in the corresponding entry. Otherwise (i.e., lookup miss), the packet is flooded in the

| DEVICE | VTEPs |
|---|---|
| TOR11 | TOR12-VE-VTEP, TOR13-VE-VTEP, GW11-VE-VTEP, GW12-VE-VTEP |
| TOR 12 | TOR11-VE-VTEP, TOR13-VE-VTEP, GW11-VE-VTEP, GW12-VE-VTEP |
| TOR13 | TOR11-VE-VTEP, TOR12-VE-VTEP, GW11-VE-VTEP, GW12-VE-VTEP |
| GW11 (DF) | TOR11-VE-VTEP, TOR12-VE-VTEP, TOR13-VE-VTEP, GW21-WAN-VTEP, GW22-WAN-VTEP |
| GW12 (non-DF) | TOR11-VE-VTEP, TOR12-VE-VTEP, TOR13-VE-VTEP, GW21-WAN-VTEP, GW22-WAN-VTEP |

An example illustrating unicast communication between a first host (H1) connected to TOR11 (in DC1) and a second host (H2) connected to TOR21 (DC2) is now described. Based on a lookup result in its MAC/Multicast IP forwarding table(s), TOR11 encapsulates the packet (or data traffic) received from H1 in a VXLAN packet and forwards it over a layer 2 VXLAN tunnel (also referred to as "tunneling" or "tunnels it") to either GW11 or GW12 (See, e.g., the endpoints in the TOR11 row in Table 1 above.) This is done within DC1.

Next GW11 or GW12 decapsulates the VXLAN packet. GW11 or GW12 performs a MAC/IP lookup on its forward- BD. If, on the other hand, IGMP/MLD snooping is enabled on a BD, lookup happens based on destination multicast IP. If an entry is found (i.e., lookup hit), the packet is forwarded to list of receivers (receiver in the BD on the switch and receiver in the stretched BD on other switch). Otherwise (i.e., lookup miss), the packet is dropped in the BD.

Note that some traffic received will be broadcast, unknown unicast, or multicast traffic. These types of traffic are commonly referred to as BUM traffic. FIG. 5 illustrates the flow of BUM traffic in the same example network environment 400 of FIG. 4. In FIG. 5, H1 sends a BUM packet to TOR11. TOR11 performs ingress replication 510, whereby a VXLAN packet is sent to each of TOR12, TOR13, GW11 and GW12. (Recall, e.g., the endpoints in the TOR11 row in Table 1 above.) TOR11 also floods the packet back to its local hosts. (520) Similarly, responsive to receiving the VXLAN packet, each of TOR12 and TOR13 decapsulate the packet and flood it to its local hosts. (522 and 523) Further, responsive to receiving the VXLAN packet, each of GW11 and GW12 decapsulate the packet and perform local flooding. (531 and 532) (Note that a GW in a DC that receives a VXLAN BUM packet from any of the TORs or another GW in the same DC will not flood the packet back. Similarly, a VXLAN BUM packet received by a TOR from another TOR in the same DC will not be flooded back. This is similar handling for ESI to avoid duplicate packet.) Further, since GW11 is the DF, it encapsulates the packet with appropriate VXLAN headers and floods/replicates it to each of GW21 and GW22. (Recall, e.g., the endpoints in the GW11 row of Table 1.) (540) (Note in the following, the term "flood" is intended to include "replicate" in the context of IP multicast.) Note that GW12 does not flood the payload to GW21 and GW22 in DC2 because the BD role of GW12 is non-DF.

Next, at DC2, each of GW21 and GW22 receives the packet from GW11. Both GW21 and GW22 decapsulate the VXLAN packet, and flood it locally. (551 and 552) Further, since the BD role of GW21 is DF, it encapsulates the packet in appropriate VXLAN headers and tunnels a copy of the VXLAN packet to each of TOR21, TOR22, and TOR23. (560) Since, however, the BD roles of GW22 is non-DF, it does not forward copies of the packet to the TORs in DC2. Each of TOR21, TOR22, and TOR23 then decapsulates the packet received, and floods the packed to local devices. (571, 572 and 573)

Next, FIGS. 6 and 7 illustrate the forwarding of layer 2 (L2) known unicast traffic for two different flows. Referring first to FIG. 6, TOR13 receives a packet having a source MAC address M1, destined for MAC address M2. Since TOR13 has an entry in its forwarding table(s) 610 for destination MAC address M2, M2 is reachable via two VTEPs as indicated in VXLAN Load Balance Nexthop (VLBNH). Based on some hashing algorithm, one of the VTEPs is picked from the VLBNH entries (assume GW11). TOR13 encapsulates the packet with an appropriate VXLAN header, and tunnels the encapsulated packet to GW11. GW11 decapsulates the encapsulated packet. Since GW11 has an entry in its forwarding table(s) 620 for destination MAC address M2, M2 is reachable via two VTEPs as indicated in VXLAN Load Balance Nexthop (VLBNH). Based on some hashing algorithm, one of the VTEPs is picked from the VLBNH entries (assume GW22). GW11 encapsulates the packet with an appropriate VXLAN header, and tunnels the encapsulated packet to GW22. Next, GW22 decapsulates the encapsulated packet. Since GW22 has an entry in its forwarding table(s) 630 for destination MAC address M2, it picks as the next hop, the VXLAN tunnel to TOR21, encapsulates the packet with an appropriate VXLAN header, and tunnels the encapsulated packet to TOR21. TOR21 decapsulates the encapsulated packet and (assuming it has a matching entry in its forwarding table(s) (not shown)) forwards it to local host H2 (which has a MAC address of M2).

Referring again to MAC tables 610 and 620, note that VLBNH entries are similar to equal cost multipath (ECMP) entries. However, the entries may be selected differently (e.g., due to a different source MAC address and/or a different source IP address). Referring next to FIG. 7, TOR13 receives a packet having a source MAC address M1, destined for MAC address M2. Since TOR13 has an entry in its forwarding table(s) 610 for destination MAC address M2, M2 is reachable via two VTEPs as indicated in VXLAN Load Balance Nexthop (VLBNH). Based on some hashing algorithm, one of the VTEPs is picked from the VLBNH entries (assume GW12 this time). TOR13 encapsulates the packet with an appropriate VXLAN header, and tunnels the encapsulated packet to GW12. GW12 decapsulates the encapsulated packet. Since GW12 has an entry in its forwarding table(s) 620 for destination MAC address M2, M2 is reachable via two VTEPs as indicated in VXLAN Load Balance Nexthop (VLBNH). Based on some hashing algorithm, one of the VTEPs is picked from the VLBNH entries (assume GW22). GW12 encapsulates the packet with an appropriate VXLAN header, and tunnels the encapsulated packet to GW22. Next, GW22 decapsulates the encapsulated packet. Since GW22 has an entry in its forwarding table(s) 630 for destination MAC address M2, it picks as the next hop, the VXLAN tunnel to TOR21, encapsulates the packet with an appropriate VXLAN header, and tunnels the encapsulated packet to TOR21. TOR21 decapsulates the encapsulated packet and (assuming it has a matching entry in its forwarding table(s) (not shown)) forwards it to local host H2 (which has a MAC address of M2).

Note that there was no duplication or flooding (replication) of the packet since it was a known unicast packet. That is, each of the forwarding devices had an entry in their respective MAC forwarding table 610/620/630 matching the destination MAC address (M2) in the packet. Given the L2 tunneling (and associated encapsulation/decapsulation), the destination MAC address in the underlying packet did not change.

Problems of unwanted duplication and excessive flooding of BUM traffic in VXLAN DCs and DCIs are now illustrated with reference to FIGS. 8-10.

In some data forwarding devices (such as some routers from Juniper Networks, Inc. of Sunnyvale, CA) received BUM traffic (e.g., traffic with the B-bit in the VXLAN header set to 1) is flooded only if there is no MAC/IP multicast entry in its forwarding table(s) matching the destination MAC address of the packet (regardless of the data forwarding device's BD type, and regardless of the data forwarding device's BD role). If, on the other hand, there is an entry in its MAC/IP multicast forwarding table(s) matching the destination MAC address of the packet, the packet is forwarded in accordance with this entry (regardless of the data forwarding device's BD type, and regardless of the data forwarding device's BD role). Unwanted packet duplication caused by this procedure is illustrated in FIGS. 8 and 10.

In some other data forwarding devices (such as some other routers from Juniper Networks, Inc. of Sunnyvale, CA) received BUM traffic (e.g., traffic with the B-bit in the VXLAN header set to 1) is flooded, regardless of whether or not there is an entry in its MAC/IP multicast forwarding table(s) matching the destination MAC address of the packet, regardless of the data forwarding device's BD type, and regardless of the data forwarding device's BD role. Excessive flooding caused by this procedure is illustrated in FIG. 9.

The problem of unwanted packet duplication in some data forwarding devices is illustrated in FIG. 8. As shown, host H1 sends a unicast packet in VLAN=Red, with source MAC address=M1 and destination MAC address=M2. Assume that GW11 and GW12 have a forwarding table entry for destination MAC=M2. However, assume that TOR13 does not have a forwarding table entry for destination MAC=M2 (e.g., assume that it is not yet synced via an EVPN route from GW11 and/or GW12). TOR13 does ingress replication, encapsulates the packet with a VXLAN header, and tunnels the encapsulated packets to each of TOR11, TOR12, GW11 and GW12. (820) (Recall the VXLAN tunnels in row three of Table I.) TOR13 further floods the packet (without encapsulation) on its ports associated with VLAN=Red. (830) Each of TOR11 and TOR12 drops the VXLAN packet from TOR13 if the destination MAC address=M2 has been learned by these devices. (841 and 842)

Responsive to receiving the tunneled VXLAN encapsulated packet, each of GW11 and GW12 decapsulates the received packet, and performs lookup(s). Since each of GW11 and GW12 has a matching entry in their MAC forwarding table 850, based on the lookup result, each of GW11 and GW12 encapsulates the packet, and tunnels the VXLAN packet to GW21 or GW22 based on VLBNH hash result. (861 and 862) The fact that both GW11 and GW12 send a copy of the VXLAN packet is an unwanted duplication.

Responsive to receiving the tunneled packet 863 and 864, each of GW21 and GW22 decapsulates the received packet, and performs lookup(s). Since each of GW21 and GW22 has a matching entry in its MAC forwarding table 870, based on the lookup result, each of GW21 and GW22 encapsulates the packet, and tunnels their respective copy of the VXLAN packet to TOR21. (881 and 882) Note that the unwanted duplication by GW11 and GW12 is a source of an additional unwanted duplication.

TOR21 receives duplicate copies of VXLAN packet-one from GW21 and the other from GW22. (883 and 884) TOR21 decapsulates the received packet, and performs lookup(s). Even assuming that TOR21 has a matching entry in its MAC forwarding table (not shown), based on the lookup result, TOR21 sends the packet (without further encapsulation) to host H2. Note that the unwanted duplication by GW11 and GW12 is a source of a yet another unwanted duplication. (891) Consequently, host H2 receives duplicate copies of the same L2 packet.

Next, the problem of unwanted packet flooding in some data forwarding is illustrated in FIG. 9. As shown, host H1 sends a unicast packet in VLAN=Red, with source MAC address=M1 and destination MAC address=M2. Assume that GW11 and GW12 have a MAC forwarding table entry for destination MAC=M2. However, assume that TOR13 does not have a forwarding table entry for destination MAC=M2 (e.g., assume that it is not yet synced via an EVPN route from GW11 and/or GW12). (905) TOR13 does ingress replication 910, encapsulates the packet with a VXLAN header, and tunnels a VXLAN packet to each of TOR11, TOR12, GW11 and GW12. (Recall the VXLAN tunnels in row three of Table I.) TOR13 further floods the packet (without encapsulation) on its ports associated with VLAN=Red. (920)

Each of GW11 and GW12 decapsulates the packet. Even though each has a matching entry in their MAC forwarding table 930, each nonetheless performs ingress replication and sends one L2 copy to each CE in VLAN=Red. (941 and 942) Further GW11 encapsulates the packet and floods the VXLAN packet to each of GW21 and GW22. (950) Similar flooding by GW12 is blocked (due to I-ESI filtering) since it is non-DF for the BD. That is, GW12 forwards a copy of the unencapsulated L2 packet to all members of VLAN=Red 942, but it does not send VXLAN packets to remote GW21 and GW22.

Upon receiving the VXLAN encapsulated packet, GW21 decapsulates it, performs ingress replication and sends one L2 copy to each CE in the VLAN=Red. (971) In addition, since GW21 is the DF in the BD, it encapsulates the packet with a VXLAN header, and tunnels the VXLAN packet to each of TOR21, TOR22, and TOR23. (980) Note that flooding is performed even though GW21 and GW22 have a matching entry in their respective MAC forwarding table 975. At the other gateway, upon receiving the VXLAN encapsulated packet, GW22 floods a copy of the L2 packet to all members of VLAN=Red. (972) However, since GW22 is non-DF for the BD, it does not send VXLAN packets to TOR21, TOR22, and/or TOR23.

In the following, assume that each of TOR21, TOR22 and TOR23 have a forwarding table entry for destination MAC address=M2. TOR21 decapsulates the packet and sends the L2 packet to host H2. However, after decapsulation, each of TOR22 and TOR23 drops the packet. Referring back to DC 1, assuming that they have also learned the destination MAC address=M2, TOR11 and TOR12 also drop the packet.

As can be appreciated from FIG. 9, significant unwanted flooding occurs.

Finally, the problem of unwanted packet duplication within a DC, in some data forwarding devices, is illustrated in FIG. 10. Host H1 sends a unicast packet in VLAN=Red, with source MAC address=M1 and destination MAC address=M2, to TOR11. (1010) Assume that on TOR11, MAC address M2 is not yet synchronized via EVPN route from TOR12. That is, TOR11 does not have a matching entry in its MAC forwarding table 1020. Consequently, TOR11 floods the packet in VLAN=Red. (1031 and 1032) As a result, host H2 receives a copy of the packet via interface (I/F) 2. (1031) TOR11 also encapsulates the packet with a VXLAN header, and tunnels the VXLAN packet to TOR12 (and TOR13, GW11, and GW12, not shown). Responsive to TOR12 receiving the VXLAN packet (with BUM bit set), TOR12 decapsulates the packet. Since it has an entry in its MAC forwarding table 1040 for destination MAC address M2, it sends a copy of the packet to host H2 via I/F 4. (1050) As can be seen, host H2 receives duplicate copies of the same L2 packet, which is not desired.

As can be appreciated from the foregoing examples (and similar cases in which a data forwarding device does not have a matching entry in its IP multicast forwarding table for a received IP multicast packet), it would be useful to modify forwarding rules of routers and/or switches in interconnected L2 broadcast domains (e.g., DCs and DCIs with a VXLAN overlay) so that BUM traffic is properly forward, but with reduced (e.g., eliminated) unnecessary duplication and/or flooding.

§ 2. SUMMARY OF THE INVENTION

In the context of interconnected L2 broadcast domains (e.g., DCs and DCIs with a VXLAN overlay), example embodiments consistent with the present description modify forwarding rules of routers and/or switches so that BUM traffic is properly forward, but withe reduced (e.g., eliminated) unnecessary duplication and/or flooding. Such example embodiments may do so by providing an example method for use in a data forwarding device (e.g., a router, switch, etc.), for forwarding BUM traffic. The data forwarding device (in a broadcast domain (BD)) receives a packet including a VXLAN header, wherein the VXLAN header includes information (e.g., a B-bit) indicating that the packet is ingress replicated Broadcast, Unknown unicast, or Multicast (BUM) traffic. Responsive to receiving the packet in the BD, the data forwarding device then determines whether any of (1) the data forwarding device does not belong to a data center interconnect (DCI) broadcast domain (BD) (i.e., BD type is non-DCI), (2) a MAC/IP multicast forwarding table(s) in the data forwarding device for the BD does not have an entry corresponding to a destination MAC/IP multicast address in the packet received (i.e., lookup miss), or (3) the data forwarding device is not a designated forwarder (DF) for the BD (i.e., BD role is non-DF). If any of these three conditions is met, the example method floods the packet in the BD. In some example implementations, the act of flooding the packet in the BD is subject to one or both of (1) Interconnect ESI (I-ESI) filtering if the data forwarding device is a non-DF for the BD, and/or (2) local bias processing. If none of the three conditions is met (put differently, responsive to determining that all of (1) the data forwarding device belongs to a data center interconnect (DCI) broadcast domain (BD) (i.e., BD type is DCI), (2) a MAC/IP multicast forwarding table(s) in the data forwarding device for the BD has an entry corresponding to a destination MAC/IP multicast IP address in the packet received (lookup hit), and (3) the data forwarding device is a designated forwarder (DF) for the BD (i.e., BD role is DF), the example method performs layer 2 (L2) unicast/IP multicast data forwarding on the packet using the entry in the MAC/IP multicast forwarding table(s). In the example method, the three conditions need not be checked in any particular order. Indeed, once any condition fails (and flooding is indicated), the other condition(s) need not be checked.

In one example implementation, the following forwarding rules are used if the BUM bit is set to 1. Responsive to determining that all of (1) a MAC/IP multicast forwarding table(s) in the data forwarding device for the BD has an entry corresponding to a destination MAC/IP multicast IP address in the packet received (lookup hit), (2) the data forwarding device belongs to a data center interconnect (DCI) broadcast domain (BD), and (3) the data forwarding device is a designated forwarder (DF) for the BD, layer 2 (L2) unicast/IP multicast data forwarding is performed on the packet using the entry in the MAC/IP multicast forwarding table(s). Responsive to determining (1) a MAC/IP multicast forwarding table in the data forwarding device for the BD has an entry corresponding to a destination MAC/IP multicast destination address in the packet received, (2) the data forwarding device belongs to a data center interconnect (DCI) broadcast domain (BD), and (3) the data forwarding device is not a designated forwarder (DF) for the BD, the packet is flooded in the BD. Responsive to determining that (1) a MAC/IP multicast forwarding table(s) in the data forwarding device for the BD does not have an entry corresponding to a destination MAC/IP multicast destination address in the packet received, and (2) the data forwarding device belongs to a data center interconnect (DCI) broadcast domain (BD), the packet is flooded in the BD. This flooding occurs regardless of whether the forwarding device is the DF or a non-DF. Finally, responsive to determining that the data forwarding device does not belong to a data center interconnect (DCI) broadcast domain (BD), the packet is flooded in the BD. This flooding occurs regardless of lookup hit or miss, and occurs regardless of whether the forwarding device is the DF or a non-DF.

In some example implementations of the example methods, the act of flooding the packet received in the BD, is subject to Interconnect ESI (I-ESI) filtering only if the data forwarding device is a non-DF for the BD.

A data forwarding device (e.g., a router, a switch, etc.) may be configured to perform any of these example methods.

§ 3. BRIEF DESCRIPTION OF THE DRAWINGS

FIGS. 2A-2C illustrates an example EVPN-VXLAN packet header format that may be used to encapsulate an Ethernet frame, as well as an MPLS header.

FIG. 12 is a table illustrating example forwarding rules consistent with the method of FIG. 11.

§ 4. DETAILED DESCRIPTION

Figure 1:
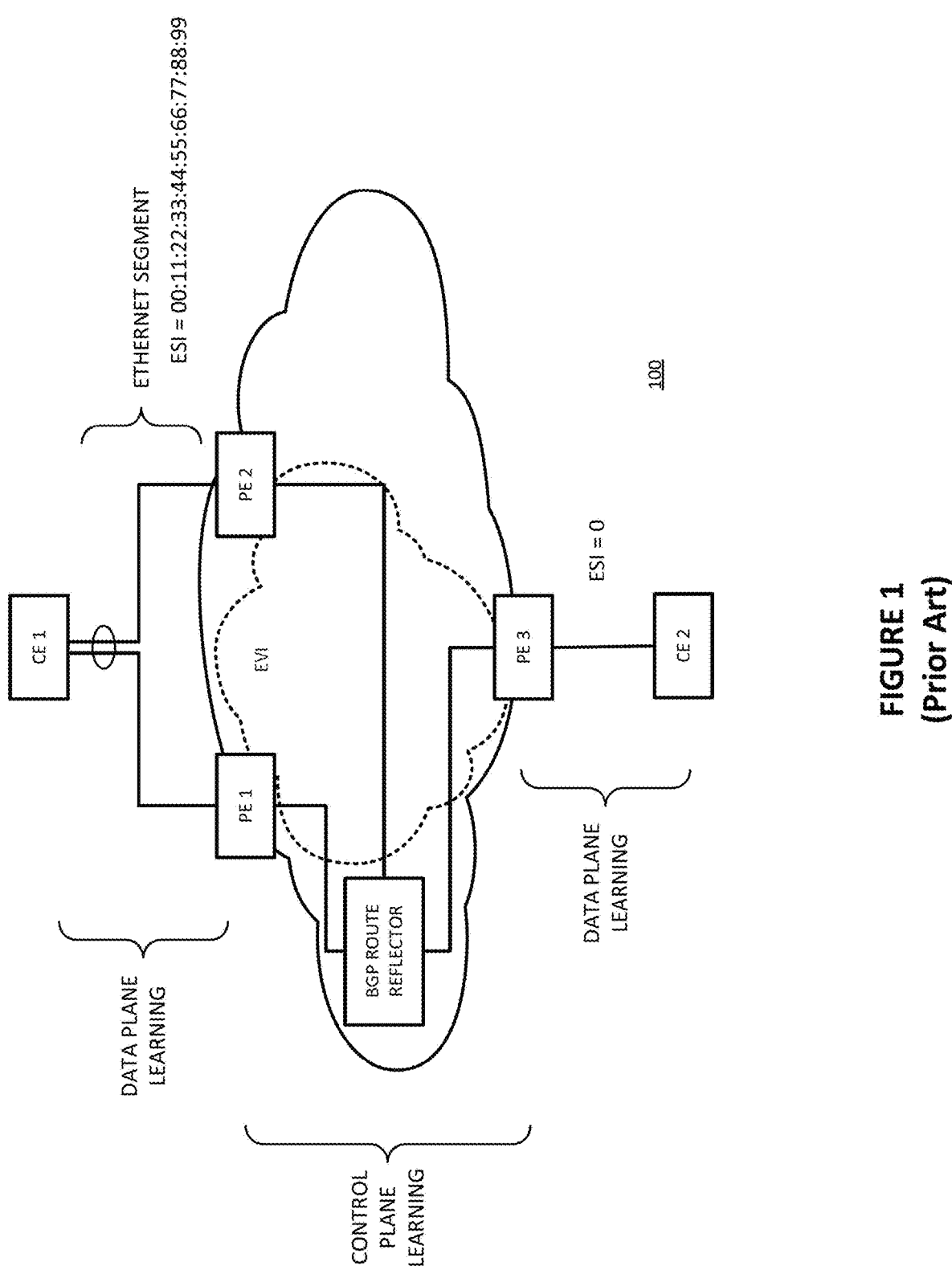
FIG. 1 is an example network topology used to provide an overview of Ethernet virtual private networks (EVPNs)
Figure 3:
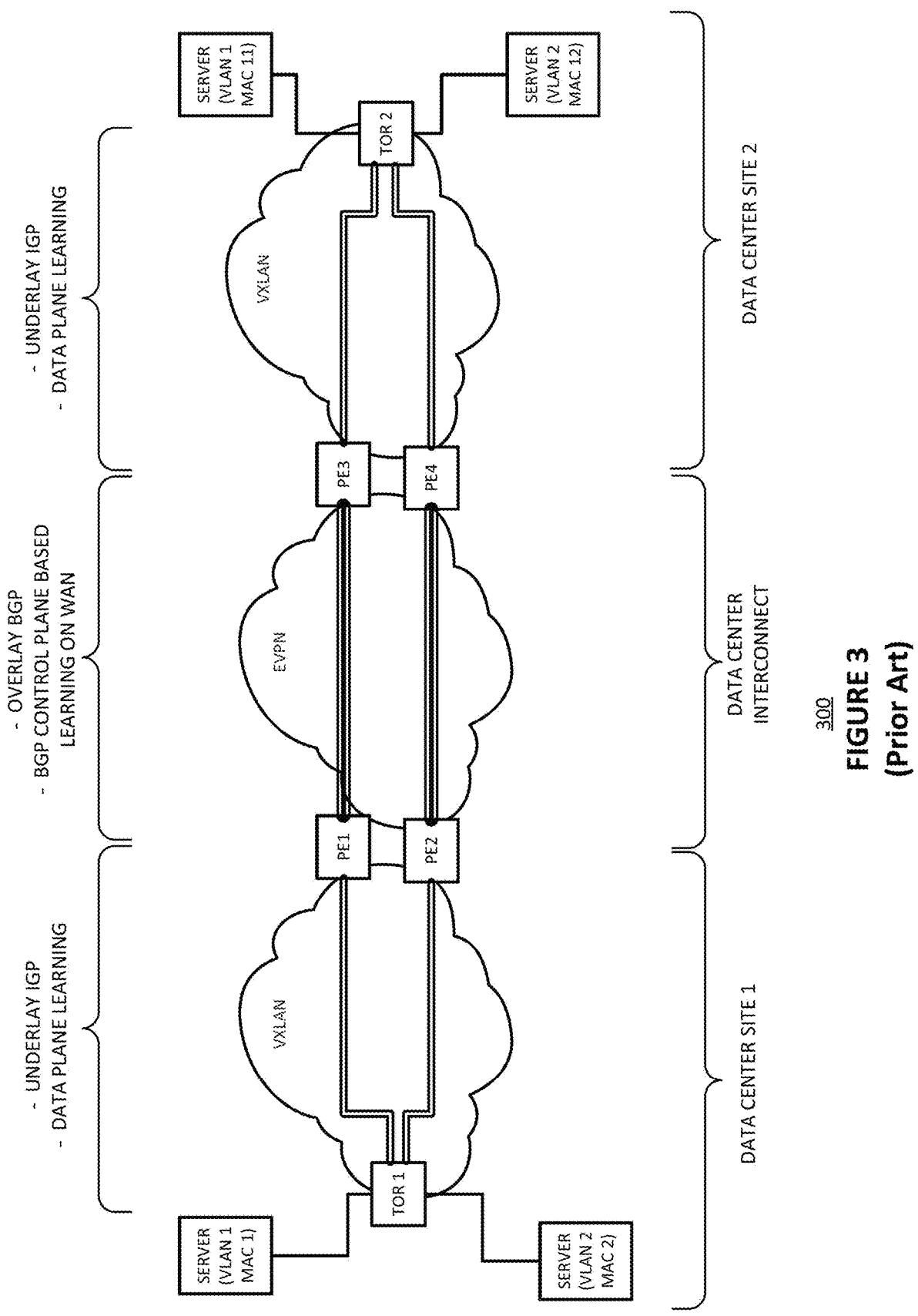
FIG. 3 is an example network topology used to provide an overview of EVPN-VXLAN integration.

The present disclosure may involve novel methods, apparatus, message formats, and/or data structures to modify forwarding rules of routers and/or switches (e.g., in environments such as interconnected L2 broadcast domains, such as DCs and DCIs with a VXLAN overlay) so that BUM traffic is properly forward, but with reduced (e.g., eliminated) unnecessary duplication and/or flooding. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 ACRONYMS AND TERMINOLOGY

BD: Broadcast Domain.

Broadcast Domain: a segment of a network within which broadcasts are forwarded. A broadcast is a message that is sent from one device to all devices within the broadcast domain. A broadcast domain can be thought of as a layer 2 domain.

BD Role: Designed Forwarder (DF), or non-DF.

BD Type: DCI (if used to interconnect DCs, that is, if a gateway device), or non-DCI.

BUM: Broadcast, Unknown Unicast, and/or Multicast traffic.

B-bit: BUM-bit in a VXLAN header. This bit is set if the previous forwarding device forwarded the packet as BUM traffic.

Gateway device: a device that belongs to both a data center (DC) and a data center interconnect (DCI).

Interconnect ESI (I-ESI) filtering rule: The I-ESI filtering rules applies to non-DF DCI BD for VXLAN packet with the B-bit set. When a non-DF DCI BD on a GW in a DC gets a VXLAN packet (with B bit set) from any local TOR/GW in the DC:

the GW decapsulates the VXLAN packet and floods the inner packet in the BD; each local connected host receives one copy; and the flooded VXLAN packets (with B-bit set) towards remote DC's GWs get dropped due to I-ESI filtering rules.

When a non-DF DCI BD on a GW in a DC gets BUM traffic from any remote DC's GWs:

the GW decapsulates the VXLAN packet and floods the inner packet in the BD;

each local connected host receives one copy; and the flooded VXLAN packets (with B-bit set) towards any local TOR/GW in the DC get dropped due to I-ESI filter rule.

Lookup hit (or miss): Whether or not the forwarding device has a forwarding table entry for a MAC or IP multicast destination address in the header of a received packet. The data forwarding device (router/switch) has two forwarding tables for a BD; (1) a MAC forwarding table, and (2) an IP multicast forwarding table.

MAC forwarding table: the lookup key for this table is <BD, MAC destination address> and output data is outgoing <port/VTEP>

IP multicast forwarding table: the lookup key for this table is <BD, IP (multicast)> and output data is a list of L2 receivers (ports and VTEPs).

When MAC is learned in a BD (e.g., via ARP), the entry is added in the MAC forwarding table. When IGMP/MLD snooping is enabled on a BD and joins are received in the BD, entries are added in IP multicast forwarding table. Generic rule(s) for the packet forwarding in a BD:

If IGMP/MLD snooping is not enabled on a BD, lookup happens based on the packet's destination MAC address. If an entry is found, the packet is forwarded to the port/VTEP in the entry. Otherwise, the packet is flooded in the BD.

If IGMP/MLD snooping is enabled on a BD, lookup happens based on destination multicast IP. If an entry is found, the packet is forwarded to list of receivers (receiver in the BD on the switch and receiver in the stretched BD on other switch) in the entry. Otherwise, the packet is dropped in the BD.

MAC/IP multicast forwarding table(s): refers to, collectively or individually, a MAC forwarding table, and an IP multicast forwarding table.

Tunnel (noun): a mechanism that allows data to be transmitted between two endpoints (ingress and egress) without using information in a header of the data that is encapsulated.

Tunnel (verb): to forward a packet over a layer 2 (L2) tunnel, such as a VXLAN tunnel, from an ingress VTEP to an egress VTEP. This typically includes encapsulating the packet at the ingress of the tunnel for forwarding through the tunnel, and decapsulating the packet at the egress of the tunnel.

§ 4.2 EXAMPLE METHOD(S)

Figure 4:
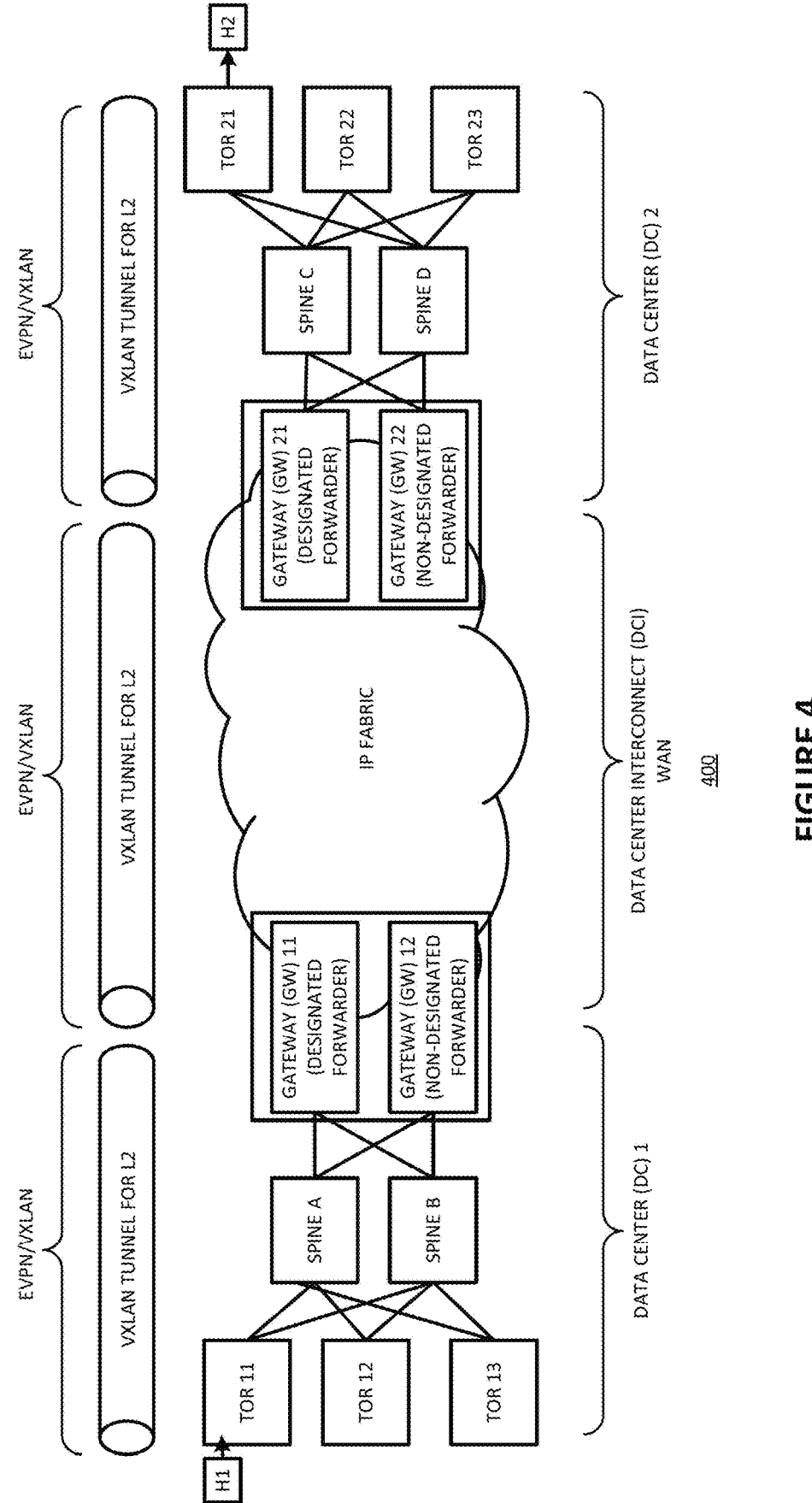
FIG. 4 illustrates an example environment in which example embodiments consistent with the present description may be used to avoid unwanted duplication and/or to reduce (e.g., eliminate) excessive flooding of BUM traffic.
Figure 11:
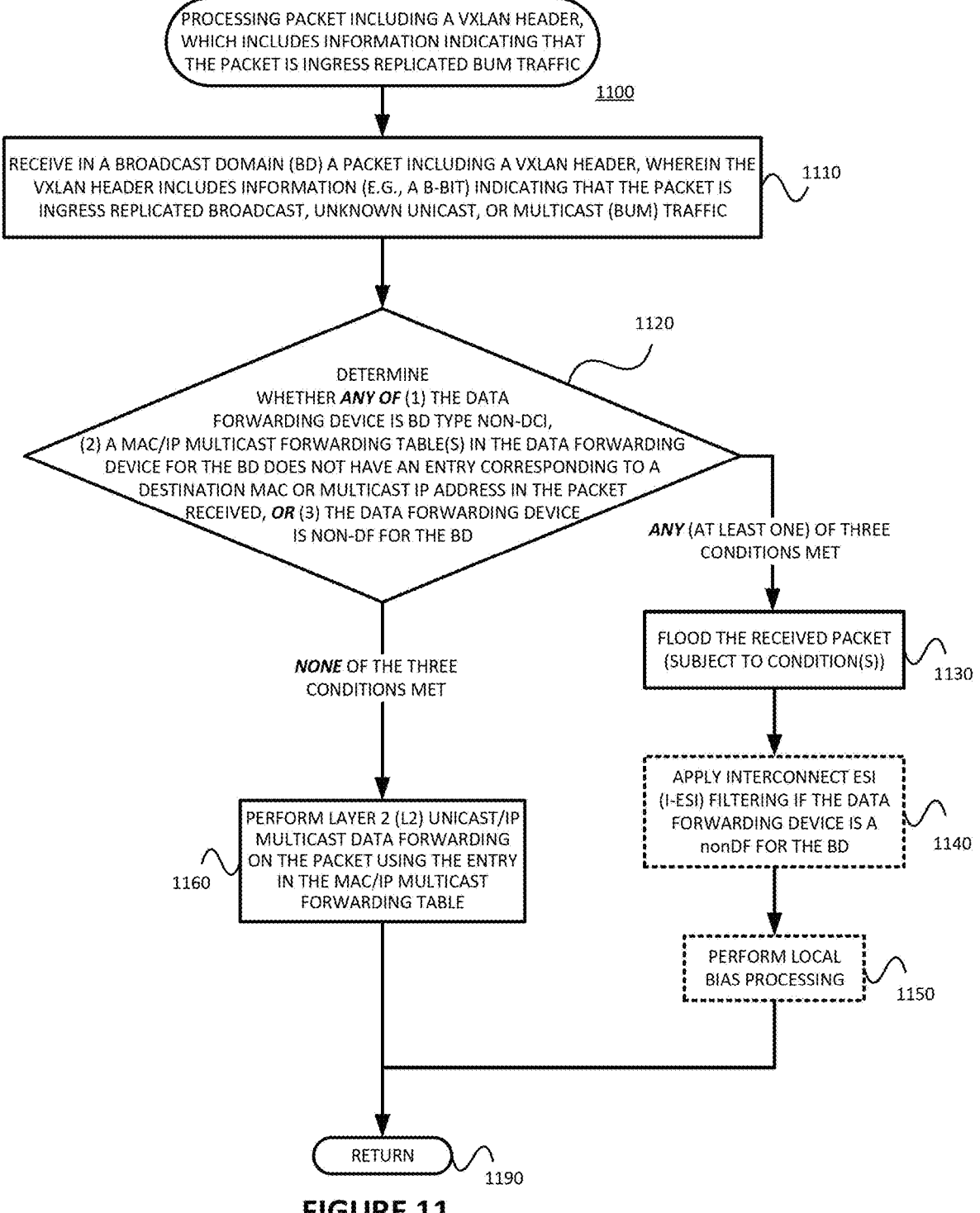
FIG. 11 is a flow diagram of an example method for reducing or eliminating unwanted duplication and/or flooding of BUM traffic in interconnected layer 2 (L2) broadcast domains (BDs).

FIG. 11 is a flow diagram of an example method 1100 for use in a data forwarding device (e.g., a router, switch, etc.), for forwarding BUM traffic with reduced (e.g., eliminated) unnecessary duplication and/or flooding, in a manner consistent with the present description. As one example, the example method 1100 may be used in one or more devices in the example environment 400 of FIG. 4. Per the example method 1100, the data forwarding device (in a broadcast domain (BD)) receives a packet including a VXLAN header, wherein the VXLAN header includes information (e.g., a B-bit) indicating that the packet is ingress replicated Broadcast, Unknown unicast, or Multicast (BUM) traffic. (Block 1110). Responsive to receiving the packet in the BD, the data forwarding device then determines whether any of (1) the data forwarding device does not belong to a data center interconnect (DCI) broadcast domain (BD) (i.e., BD type is non-DCI), (2) a MAC/IP multicast forwarding table(s) in the data forwarding device for the BD does not have an entry corresponding to a destination MAC/IP multicast address in the packet received (i.e., lookup miss), or (3) the data forwarding device is not a designated forwarder (DF) for the BD (i.e., BD role is non-DF). (Decision 1120) If any of these three conditions is met, the example method floods the packet in the BD. (Block 1130). In some example implementations, the act of flooding the packet in the BD is subject to one or both of (1) Interconnect ESI (I-ESI) filtering if the data forwarding device is a non-DF for the BD (Block 1140), and/or (2) local bias processing (Block 1150). In any event, the example method 1100 is then left. (Return node 1190)

Referring back to decision 1120, if none of the three conditions is met (put differently, responsive to determining that all of (1) the data forwarding device belongs to a data center interconnect (DCI) broadcast domain (BD) (i.e., BD type is DCI), (2) a MAC/IP multicast forwarding table(s) in the data forwarding device for the BD has an entry corresponding to a destination MAC/IP multicast IP address in the packet received (lookup hit), and (3) the data forwarding device is a designated forwarder (DF) for the BD (i.e., BD role is DF), the example method 1100 performs layer 2 (L2) unicast/IP multicast data forwarding on the packet using the entry in the MAC/IP multicast forwarding table(s). (Block 1160) The example method 1100 is then left. (Return node 1190)

In the example method 1100, the three conditions at decision 1120 need not be checked in any particular order. Indeed, once any condition fails (and flooding is indicated), the other condition(s) need not be checked. However, FIG. 12 is a table including forwarding rules in one particular implementation of the example method 1100. In FIG. 12, an "X" denotes either value. These forwarding rules are used if the BUM bit is set to 1. (See, e.g., the first column of the table.) As indicated by the first row of the table in FIG. 12, responsive to determining that all of (1) a MAC/IP multicast forwarding table(s) in the data forwarding device for the BD has an entry corresponding to a destination MAC/IP multicast IP address in the packet received (lookup hit) (See, e.g., the second column of the table.), (2) the data forwarding device belongs to a data center interconnect (DCI) broadcast domain (BD) (See, e.g., the third column of the table.), and (3) the data forwarding device is a designated forwarder (DF) for the BD (See, e.g., the fourth column of the table.), layer 2 (L2) unicast/IP multicast data forwarding is performed on the packet using the entry in the MAC/IP multicast forwarding table(s).

Referring to the next row of the table of FIG. 12, responsive to determining (1) a MAC/IP multicast forwarding table in the data forwarding device for the BD has an entry corresponding to a destination MAC/IP multicast destination address in the packet received, (2) the data forwarding device belongs to a data center interconnect (DCI) broadcast domain (BD), and (3) the data forwarding device is not a designated forwarder (DF) for the BD, the packet is flooded in the BD.

Referring to the next row of the table in FIG. 12, responsive to determining that (1) a MAC/IP multicast forwarding table(s) in the data forwarding device for the BD does not have an entry corresponding to a destination MAC/IP multicast destination address in the packet received, and (2) the data forwarding device belongs to a data center interconnect (DCI) broadcast domain (BD), the packet is flooded in the BD. As indicated by the X in the BD role column, this flooding occurs regardless of whether the forwarding device is the DF or a non-DF.

Referring to the next and final row of the table of FIG. 12, responsive to determining that the data forwarding device does not belong to a data center interconnect (DCI) broadcast domain (BD), the packet is flooded in the BD. As indicated by the X in the lookup column, this flooding occurs regardless of lookup hit or miss. As indicated by the X in the BD role column, this flooding occurs regardless of whether the forwarding device is the DF or a non-DF.

Referring back to block 1140, in some example implementations of the example method 1100, the act of flooding the packet received in the BD, is subject to Interconnect ESI (I-ESI) filtering only if the data forwarding device is a non-DF for the BD.

§ 4.3 EXAMPLE OPERATIONS OF EXAMPLE METHOD(S) IN A DC-DCI-DC ENVIRONMENT

Figure 5:
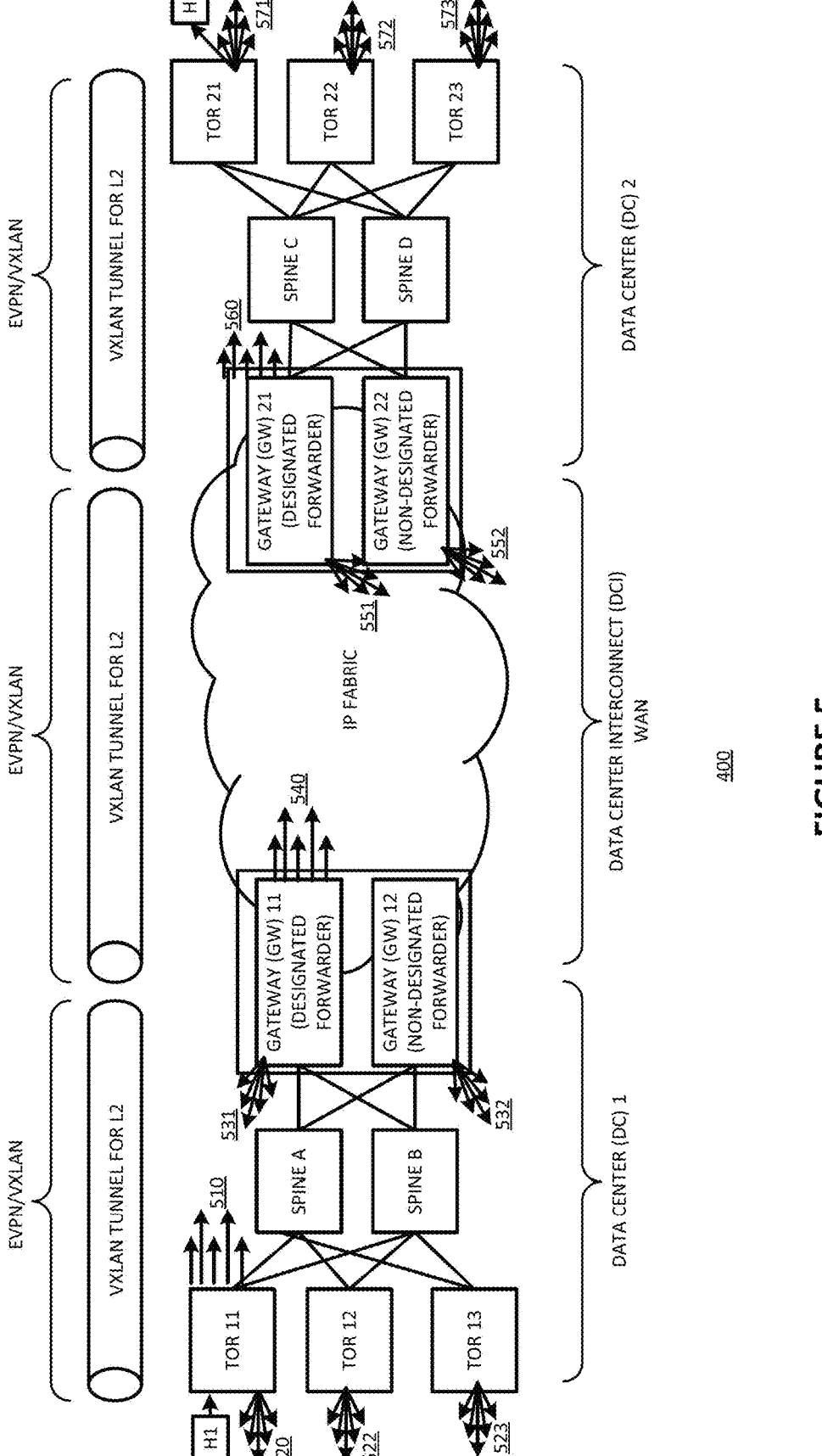
FIG. 5 illustrates the flow of BUM traffic in the example network environment of FIG. 4.
Figure 6:
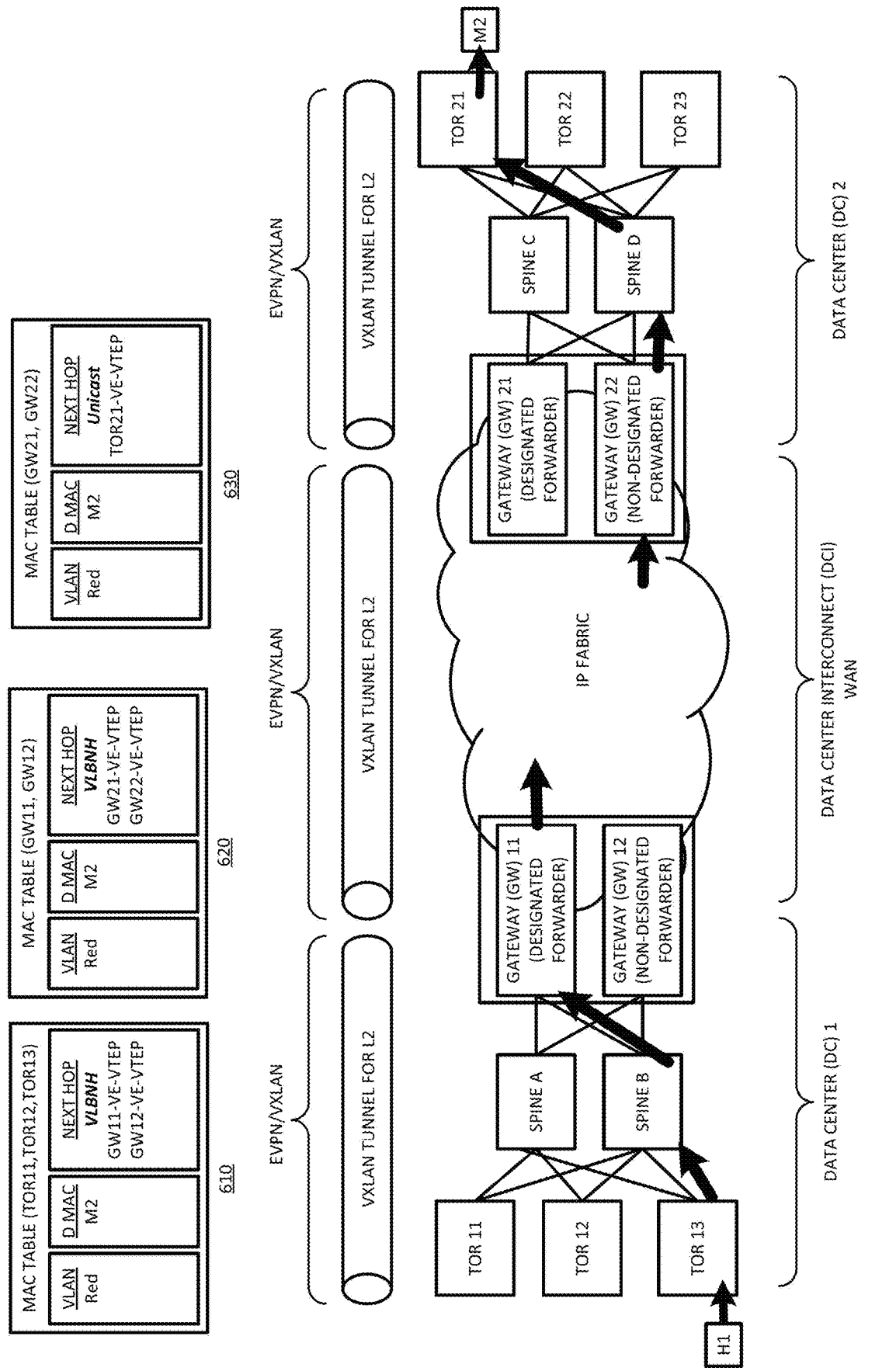
FIGS. 6 and 7 illustrate the forwarding of layer 2 (L2) known unicast traffic in two different flows, in the example network environment of FIG. 4.
Figure 7:
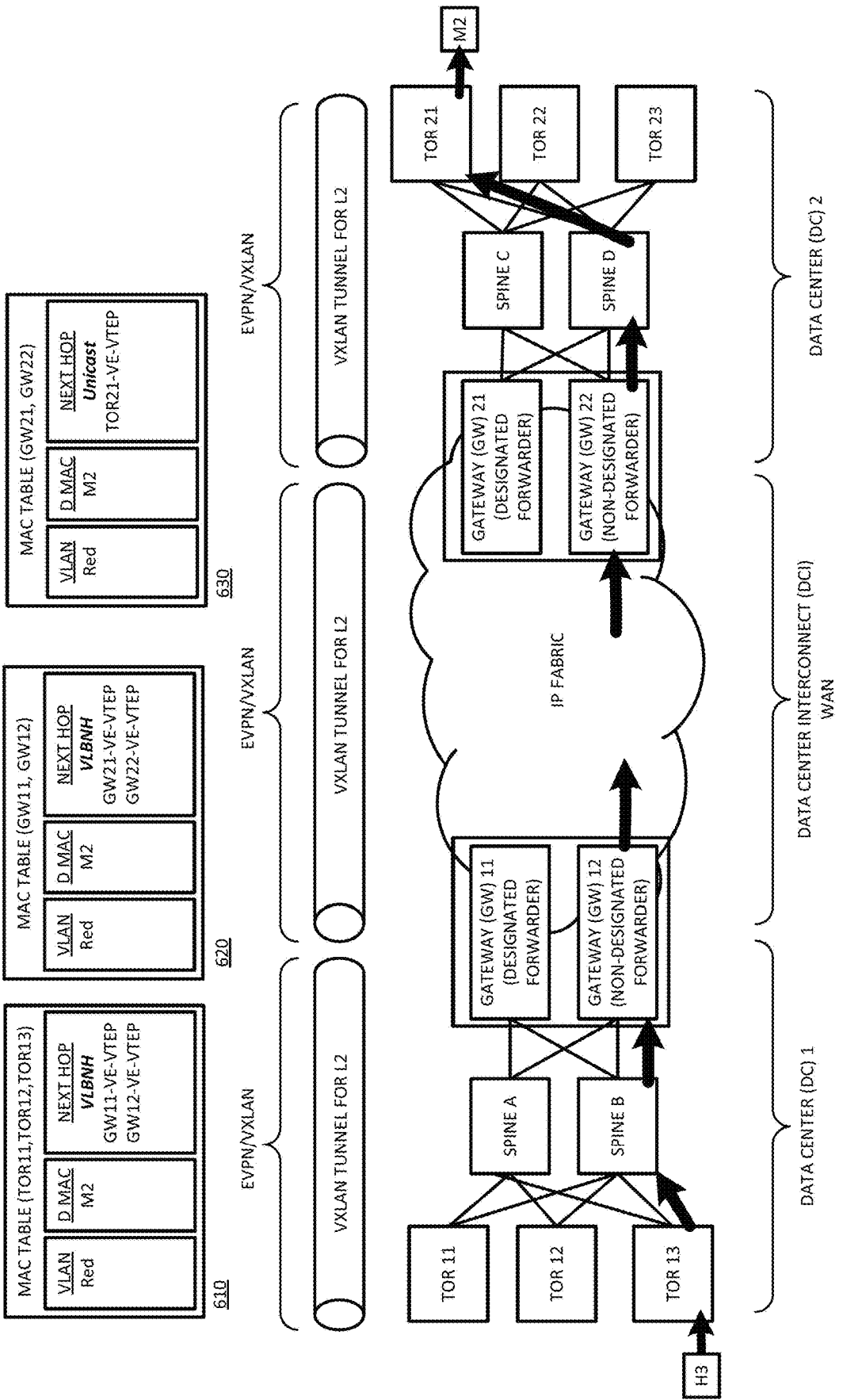
Figure 8:
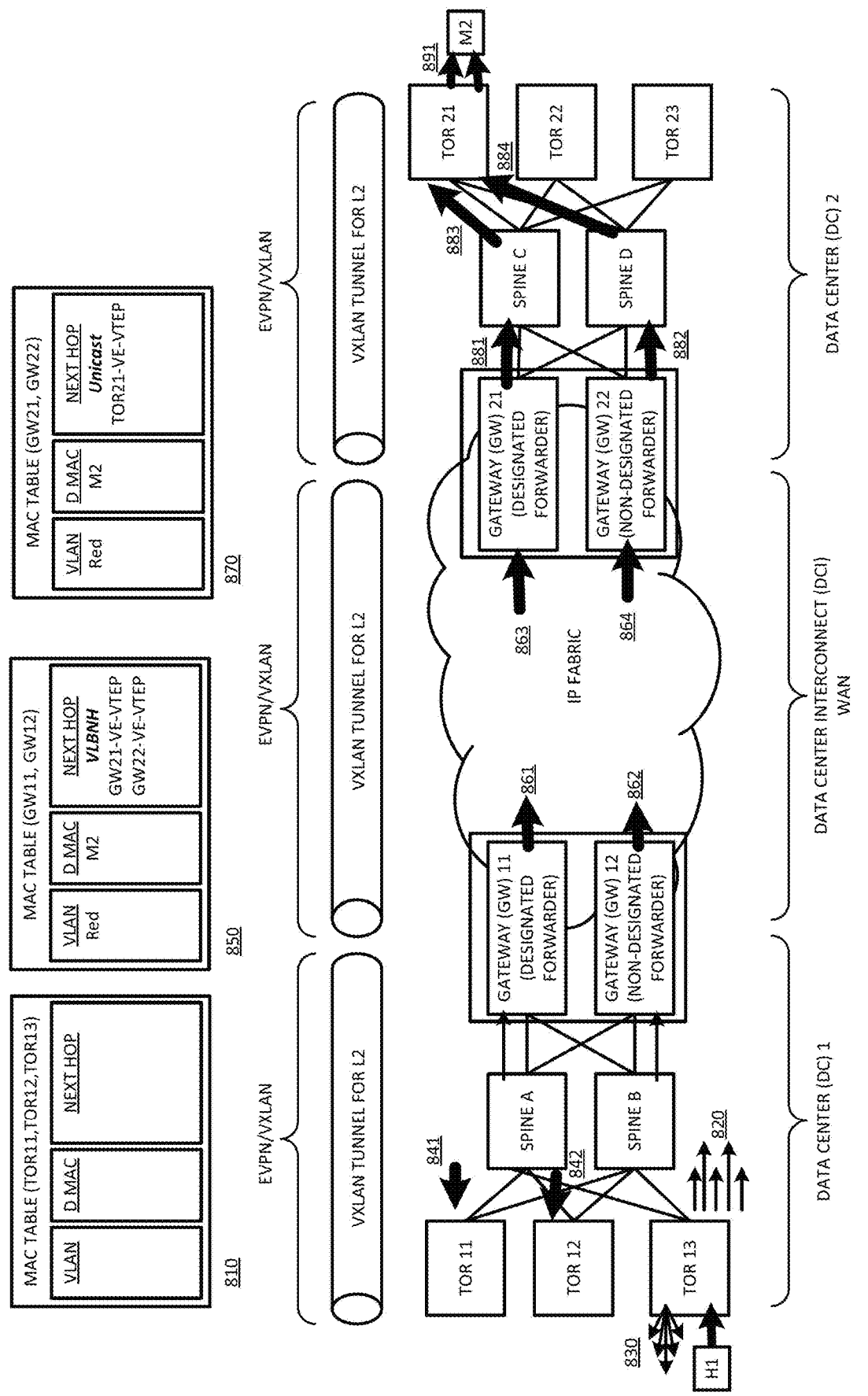
FIG. 8 illustrates the problem of unwanted duplication of BUM traffic in some data forwarding devices, in the context of the example network environment of FIG. 4.
Figure 9:
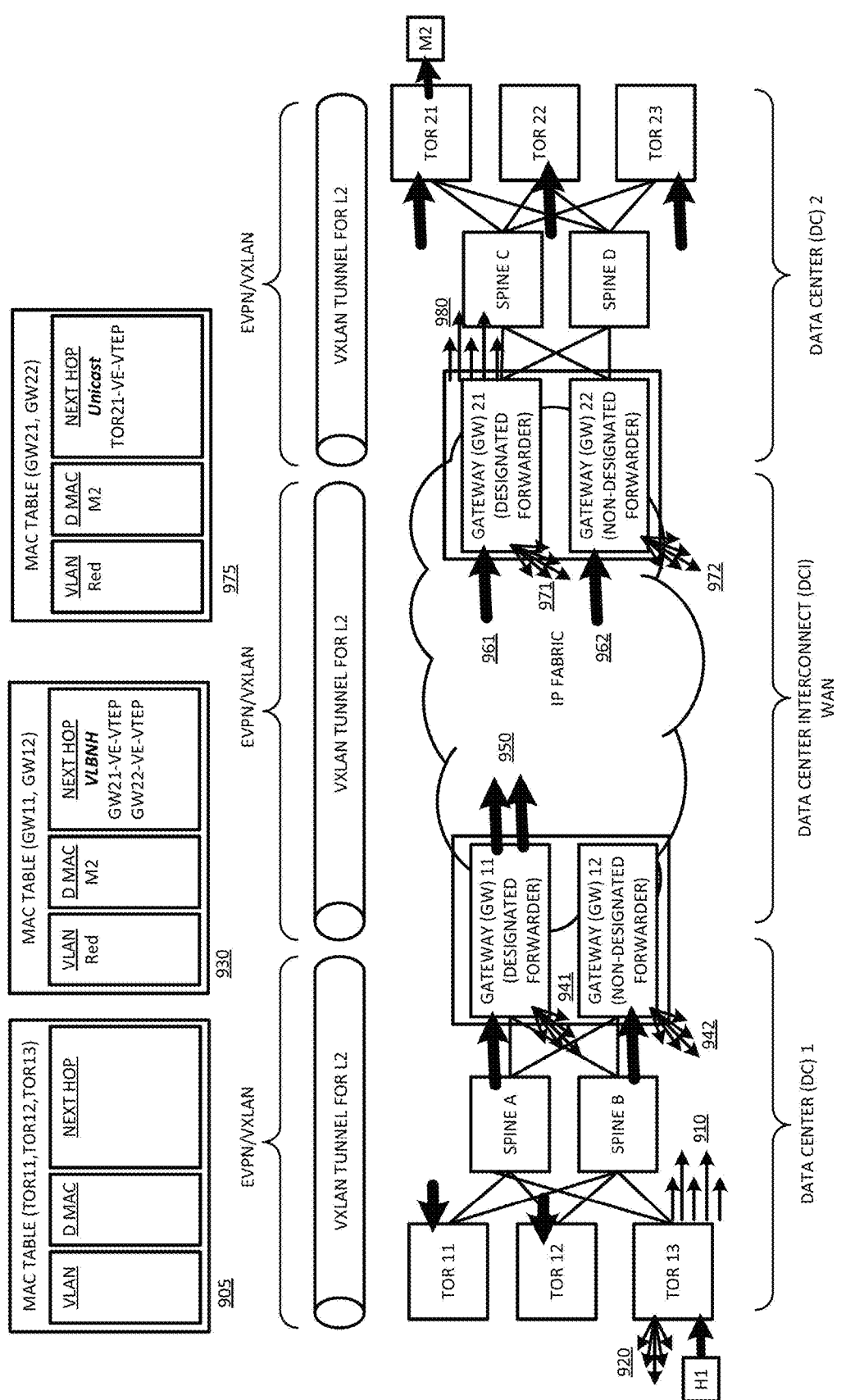
FIG. 9 illustrates the problem of unwanted flooding of BUM traffic in some other data forwarding devices, in the context of the example network environment of FIG. 4.
Figure 13:
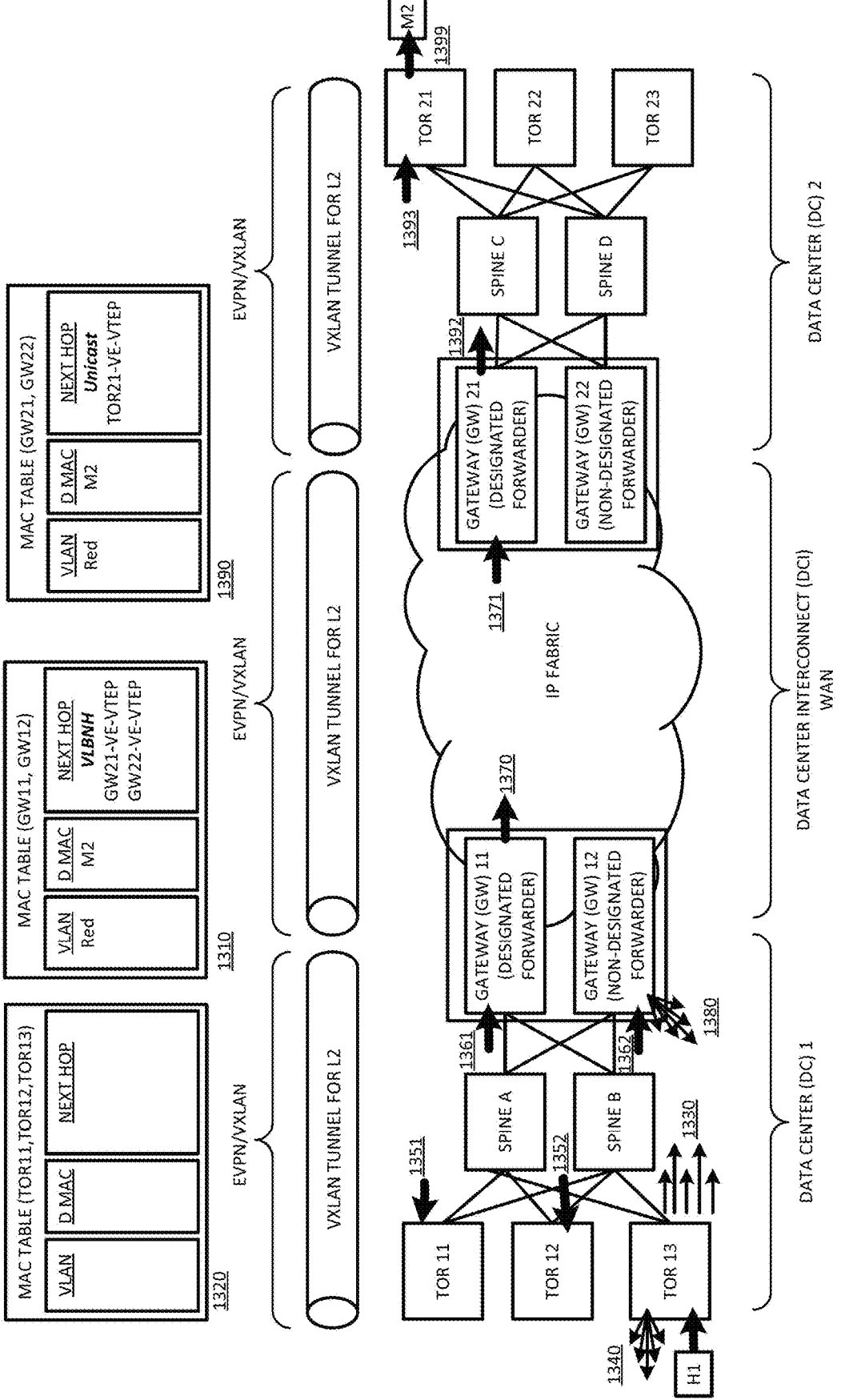
FIG. 13 illustrates, in contrast with FIGS. 5, 8 and 9, how the example method of FIG. 11 may be used to reduce or eliminate unwanted duplication and/or flooding of BUM traffic in interconnected layer 2 (L2) broadcast domains (BDs).

FIG. 13 illustrates, in contrast with FIGS. 5, 8 and 9, how the example method 1100 of FIG. 11 may be used to reduce or eliminate unwanted duplication and/or flooding of BUM traffic in interconnected layer 2 (L2) broadcast domains (BDs). As shown, host H1 sends a unicast packet in VLAN=Red, with source MAC address=M1 and destination MAC address=M2. Assume that GW11 and GW12 have a forwarding table entry for destination MAC=M2. (1310) However, assume that TOR13 does not have a forwarding table entry for destination MAC=M2 (e.g., assume that it is not yet synced via an EVPN route from GW11 and/or GW12). (1320) TOR13 does ingress replication, encapsulates the packet with a VXLAN header, and tunnels a VXLAN packet to each of TOR11, TOR12, GW11 and GW12. (1330) (Recall the VXLAN tunnels in row three of Table I.) TOR13 further floods the packet (without encapsulation) on its ports associated with VLAN=Red. 1340 TOR11 and TOR13 drop the VXLAN packet (1351 and 1352) from TOR13 if the destination MAC address=M2 has been learned by these devices.

Responsive to receiving the tunneled packet (1361 and 1362), each of GW11 and GW12 decapsulates the received packet, and performs MAC/IP multicast lookups. Since GW11 has a matching entry in its forwarding table(s) 1310, is BD type=DCI, and is the DF for the BD (i.e., BD role=DF), based on the lookup result, GW11 encapsulates the packet, and tunnels the VXLAN packet to one of GW21 or GW22. (1370) (Assume GW21 in this example). Contrast this to the scenario of unwanted flooding described with reference to FIG. 9.

Even though GW12 also has a matching entry in its forwarding table(s) and is also BD type=DCI, since it is non-DF for the BD (i.e., BD role=non-DF), it will flood the packet. However, the flooded packets towards GW21 and GW22 are blocked (due to I-ESI filtering) since it is non-DF for the BD. Thus, unwanted duplication is avoided. That is, GW12 only forwards a copy of the decapsulated L2 packet to all members of VLAN=Red. (1370) Contrast this to the scenario of unwanted duplication described with reference to FIG. 8.

Responsive to receiving the tunneled packet (1371), GW21 decapsulates the received packet, and performs MAC/IP multicast lookup(s). Since GW21 has a matching entry in its forwarding table(s) 1390, based on the lookup result, GW21 encapsulates the packet, and tunnels the VXLAN packet to TOR21. (1392) TOR21 receives the VXLAN packet tunneled from GW21 (1393), decapsulates the received packet, and performs MAC/IP multicast lookup(s). Assuming that TOR21 has a matching entry in its forwarding table(s) (not shown), based on the lookup result, TOR21 sends the packet (without further encapsulation) to host H2. (1399) Consequently, host H2 receives the L2 packet without a duplicate or copy.

Figure 10:
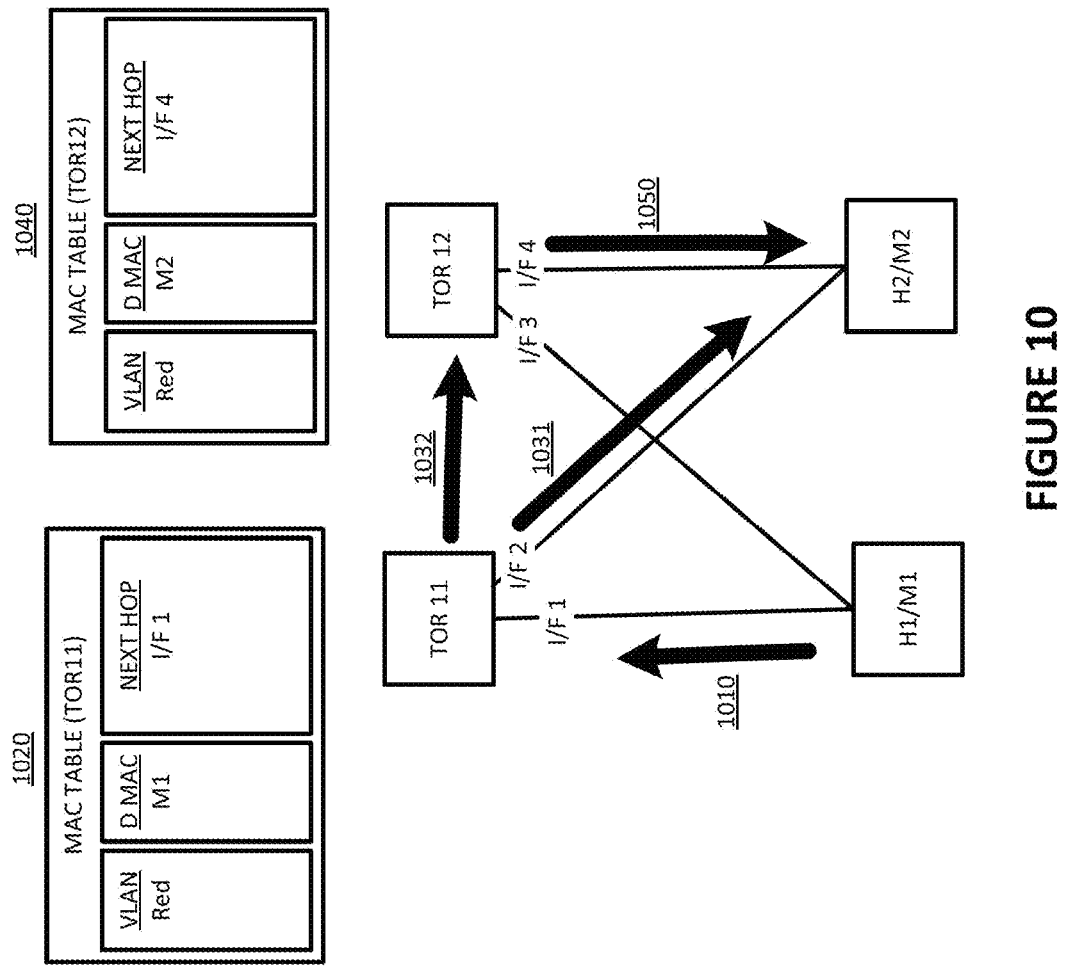
FIG. 10 illustrates the problem of unwanted duplication of BUM traffic within a DC, in some data forwarding devices, in the context of the example network environment of FIG. 4.
Figure 14:
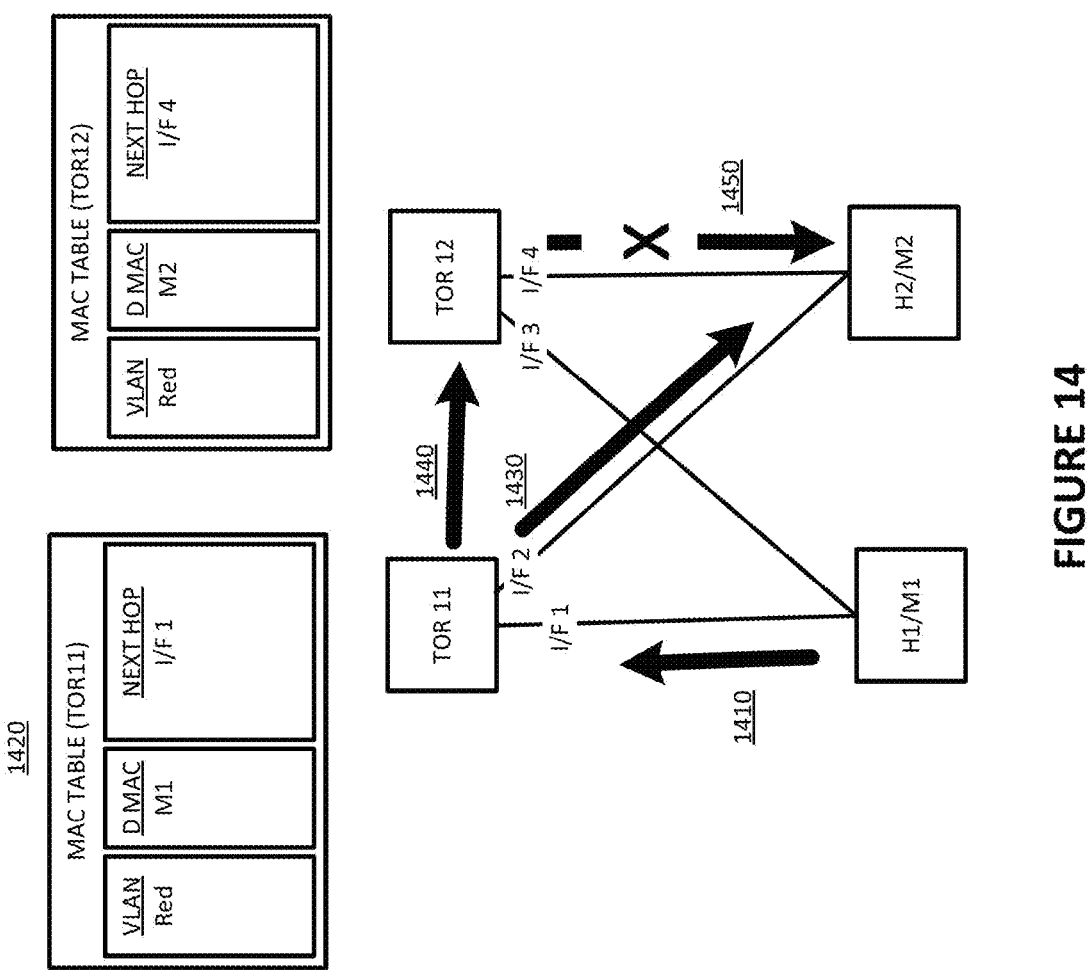
FIG. 14 illustrates, in contrast with FIG. 10, how the example method of FIG. 11 may be used to reduce or eliminate unwanted duplication of BUM traffic within a layer 2 (L2) broadcast domain (BD).

FIG. 14 illustrates, in contrast with FIG. 10, how the example method 1100 of FIG. 11 may be used to reduce or eliminate unwanted duplication of BUM traffic within a layer 2 (L2) broadcast domain (BD). Host H1 sends a unicast packet in VLAN=Red, with source MAC address=M1 and destination MAC address=M2, to TOR11. (1410) Assume that on TOR11, MAC address M2 is not yet synced via EVPN route from TOR12. That is, TOR11 does not have a MAC/IP multicast entry for MAC destination address M2 in its forwarding table 1420. Consequently, TOR11 floods the packet in VLAN=Red. (1430) As a result, host H2 receives a copy of the packet via Interface (I/F) 2. TOR11 also encapsulates the packet with a VXLAN header, and tunnels the VXLAN packet to TOR12 (and TOR13, GW11, and GW12, not shown). (1440) Responsive to TOR12 receiving the VXLAN packet (with BUM bit set), TOR12 decapsulates the VXLAN packet. Although it has an entry in its MAC forwarding table for destination MAC address M2, since it is BD type=non-DCI, it will want to flood the packet. However, flooding will be blocked due to the local bias rule. (1450) As can be seen, unlike the case in FIG. 10, host H2 does not receive any copy or duplicate of the L2 packet.

§ 4.4 EXAMPLE APPARATUS

The example method 1100 may be performed by a data forwarding device (e.g., a router or switch) belonging to a data center.

The example method 1100 may be performed by a data forwarding device (e.g., a router or switch) belonging to a network domain serving as a DCI.

The example method 1100 may be performed by a data forwarding device such as a gateway router or switch belonging to both (1) a data center, and (2) a network domain serving as a DCI interconnecting the data center with another data center.

Figure 15:
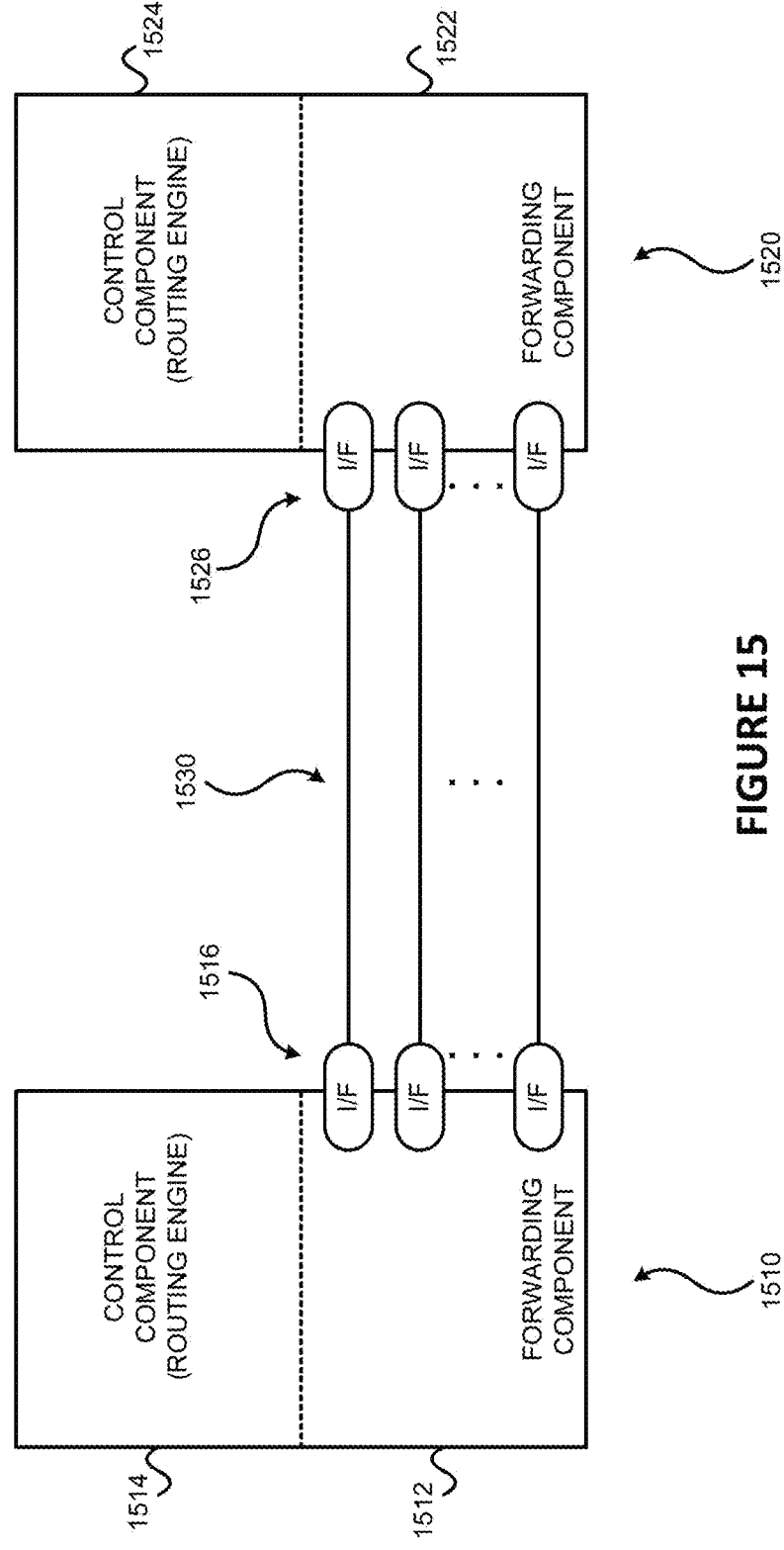
FIG. 15 illustrates two data forwarding systems, which may be used as nodes, coupled via communications links, in a communications network, such as a communications network having interconnected L2 BDs.

FIG. 15 illustrates two data forwarding systems 1510 and 1520 coupled via communications links 1530. The links may be physical links or "wireless" links. The data forwarding systems 1510,1520 may be routers for example. If the data forwarding systems 1510,1520 are example routers, each may include a control component (e.g., a routing engine) 1514,1524 and a forwarding component 1512,1522. Each data forwarding system 1510,1520 includes one or more interfaces 1516,1526 that terminate one or more communications links 1530.

As just discussed above, and referring to FIG. 16, some example routers 1600 include a control component (e.g., routing engine) 1610 and a packet forwarding component (e.g., a packet forwarding engine) 1690.

The control component 1610 may include an operating system (OS) kernel 1620, routing protocol process(es) 1630, label-based forwarding protocol process(es) 1640, interface process(es) 1650, user interface (e.g., command line interface) process(es) 1660, and chassis process(es) 1670, and may store routing table(s) 1639, label forwarding information 1645, and forwarding (e.g., route-based and/or label-based) table(s) 1680. As shown, the routing protocol process(es) 1630 may support routing protocols such as the routing information protocol ("RIP") 1631, the intermediate system-to-intermediate system protocol ("IS-IS") 1632, the open shortest path first protocol ("OSPF") 1633, the enhanced interior gateway routing protocol ("EIGRP") 1634 and the border gateway protocol ("BGP") 1635, and the label-based forwarding protocol process(es) 1640 may support protocols such as BGP 1635, the label distribution protocol ("LDP") 1636, the resource reservation protocol ("RSVP") 1637, EVPN 1638 and L2VPN 1639. The control component 1610 also supports the VXLAN protocol (not shown). One or more components (not shown) may permit a user 1665 to interact with the user interface process(es) 1660. Similarly, one or more components (not shown) may permit an outside device to interact with one or more of the router protocol process(es) 1630, the label-based forwarding protocol process(es) 1640, the interface process(es) 1650, and the chassis process(es) 1670, via SNMP 1685, and such processes may send information to an outside device via SNMP 1685.

The packet forwarding component 1690 may include a microkernel 1692 over hardware components (e.g., ASICs, switch fabric, optics, etc.) 1691, interface process(es) 1693, ASIC drivers 1694, chassis process(es) 1695 and forwarding (e.g., route-based and/or label-based) table(s) 1696 (Recall, e.g., MAC/IP multicast table(s).).

Figure 16:
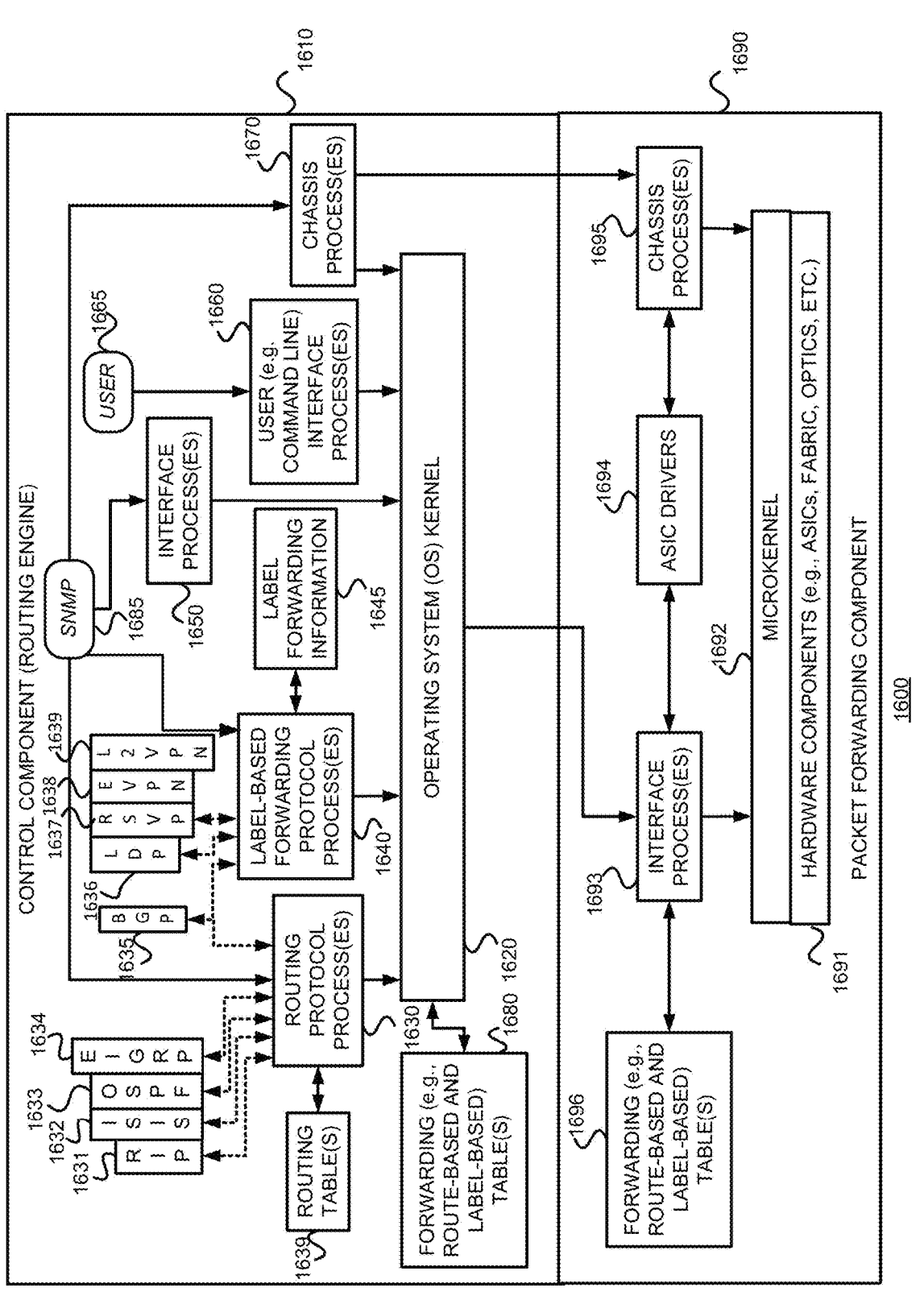
FIG. 16 is a block diagram of a router which may be used a communications network, such as communications network employing VXLAN.

In the example router 1600 of FIG. 16, the control component 1610 handles tasks such as performing routing protocols, performing label-based forwarding protocols, control packet processing, etc., which frees the packet forwarding component 1690 to forward received packets quickly. That is, received control packets (e.g., routing protocol packets and/or label-based forwarding protocol packets) are not fully processed on the packet forwarding component 1690 itself, but are passed to the control component 1610, thereby reducing the amount of work that the packet forwarding component 1690 has to do and freeing it to process packets to be forwarded efficiently. Thus, the control component 1610 is primarily responsible for running routing protocols and/or label-based forwarding protocols, maintaining the routing tables and/or label forwarding information, sending forwarding table updates to the packet forwarding component 1690, and performing system management. The example control component 1610 may handle routing protocol packets, provide a management interface, provide configuration management, perform accounting, and provide alarms. The processes 1630, 1640, 1650, 1660 and 1670 may be modular, and may interact with the OS kernel 1620. That is, nearly all of the processes communicate directly with the OS kernel 1620. Using modular software that cleanly separates processes from each other isolates problems of a given process so that such problems do not impact other processes that may be running. Additionally, using modular software facilitates easier scaling.

Still referring to FIG. 16, the example OS kernel 1620 may incorporate an application programming interface ("API") system for external program calls and scripting capabilities. The control component 1610 may be based on an Intel PCI platform running the OS from flash memory, with an alternate copy stored on the router's hard disk. The OS kernel 1620 is layered on the Intel PCI platform and establishes communication between the Intel PCI platform and processes of the control component 1610. The OS kernel 1620 also ensures that the forwarding tables 1696 in use by the packet forwarding component 1690 are in sync with those 1680 in the control component 1610. Thus, in addition to providing the underlying infrastructure to control component 1610 software processes, the OS kernel 1620 also provides a link between the control component 1610 and the packet forwarding component 1690.

Referring to the routing protocol process(es) 1630 of FIG. 16, this process(es) 1630 provides routing and routing control functions within the platform. In this example, the RIP 1631, ISIS 1632, OSPF 1633 and EIGRP 1634 (and BGP 1635) protocols are provided. Naturally, other routing protocols (e.g., ARP) may be provided in addition, or alternatively. Similarly, the label-based forwarding protocol process(es) 1640 provides label forwarding and label control functions. In this example, the LDP 1636, RSVP 1637, EVPN 1638 and L2VPN 1639 (and BGP 1635) protocols are provided. Naturally, other label-based forwarding protocols (e.g., MPLS, SR, etc.) or tunneling protocols (e.g., VXLAN) may be provided in addition, or alternatively. In the example router 1600, the routing table(s) 1639 is produced by the routing protocol process(es) 1630, while the label forwarding information 1645 is produced by the label-based forwarding protocol process(es) 1640.

Still referring to FIG. 16, the interface process(es) 1650 performs configuration of the physical interfaces and encapsulation.

The example control component 1610 may provide several ways to manage the router. For example, it 1610 may provide a user interface process(es) 1660 which allows a system operator 1665 to interact with the system through configuration, modifications, and monitoring. The SNMP 1685 allows SNMP-capable systems to communicate with the router platform. This also allows the platform to provide necessary SNMP information to external agents. For example, the SNMP 1685 may permit management of the system from a network management station running software, such as Hewlett-Packard's Network Node Manager ("HP-NNM"), through a framework, such as Hewlett-Packard's Open View. Accounting of packets (generally referred to as traffic statistics) may be performed by the control component 1610, thereby avoiding slowing traffic forwarding by the packet forwarding component 1690.

Although not shown, the example router 1600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1660 via a console port, an auxiliary port, and/or a management Ethernet port.

The packet forwarding component 1690 is responsible for properly outputting received packets as quickly as possible. If there is no entry in the forwarding table for a given destination or a given label and the packet forwarding component 1690 cannot perform forwarding by itself, it 1690 may send the packets bound for that unknown destination off to the control component 1610 for processing. The example packet forwarding component 1690 is designed to perform Layer 2 and Layer 3 switching, route lookups, and rapid packet forwarding.

As shown in FIG. 16, the example packet forwarding component 1690 has an embedded microkernel 1692 over hardware components 1691, interface process(es) 1693, ASIC drivers 1694, and chassis process(es) 1695, and stores a forwarding (e.g., route-based and/or label-based) table(s) 1696. The microkernel 1692 interacts with the interface process(es) 1693 and the chassis process(es) 1695 to monitor and control these functions. The interface process(es) 1692 has direct communication with the OS kernel 1620 of the control component 1610. This communication includes forwarding exception packets and control packets to the control component 1610, receiving packets to be forwarded, receiving forwarding table updates, providing information about the health of the packet forwarding component 1690 to the control component 1610, and permitting configuration of the interfaces from the user interface (e.g., CLI) process(es) 1660 of the control component 1610. The stored forwarding table(s) 1696 is static until a new one is received from the control component 1610. The interface process(es) 1693 uses the forwarding table(s) 1696 to look up next-hop information. The interface process(es) 1693 also has direct communication with the distributed ASICs. Finally, the chassis process(es) 1695 may communicate directly with the microkernel 1692 and with the ASIC drivers 1694.

Although example embodiments consistent with the present description may be implemented on the example routers of FIG. 15 or 16, embodiments consistent with the present description may be implemented on communications network nodes (e.g., routers, switches, etc.) having different architectures. More generally, embodiments consistent with the present description may be implemented on an example system 1700 as illustrated on FIG. 17.

Figure 17:
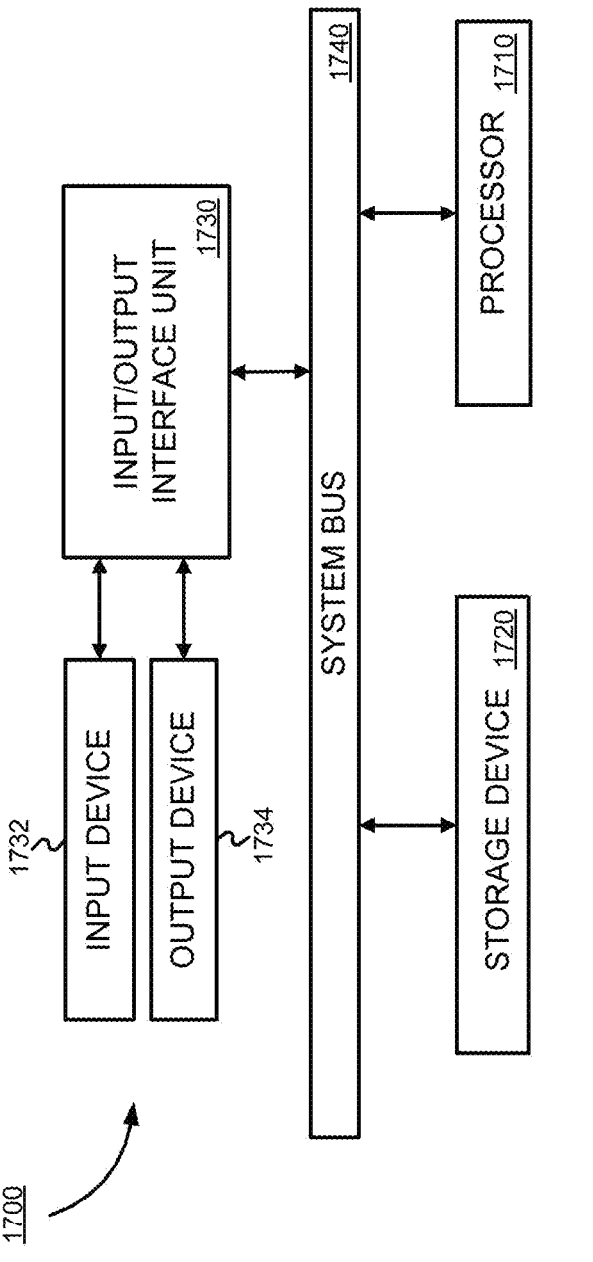
FIG. 17 is a block diagram of an exemplary machine that may perform one or more of the processes described, and/or store information used and/or generated by such processes.

FIG. 17 is a block diagram of an exemplary machine 1700 that may perform one or more of the processes described, and/or store information used and/or generated by such processes. The exemplary machine 1700 includes one or more processors 1710, one or more input/output interface units 1730, one or more storage devices 1720, and one or more system buses and/or networks 1740 for facilitating the communication of information among the coupled elements. One or more input devices 1732 and one or more output devices 1734 may be coupled with the one or more input/output interfaces 1730. The one or more processors 1710 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1720 and/or may be received from an external source via one or more input interface units 1730. The machine executable instructions may be stored as various software modules, each module performing one or more operations. Functional software modules are examples of components of the present description.

In some embodiments consistent with the present description, the processors 1710 may be one or more microprocessors and/or ASICs. The bus 1740 may include a system bus. The storage devices 1720 may include system memory, such as read only memory (ROM) and/or random access memory (RAM). The storage devices 1720 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 REFINEMENTS, ALTERNATIVES,
AND/OR EXTENSIONS

Although the example methods and apparatus were described in the context of VXLAN, they may be used in the context of other networks that use L2 tunneling to apply forwarding rules to BUM traffic.

§ 4.5 CONCLUSIONS

As can be appreciated from the foregoing, example methods and apparatus consistent with the present description improve forwarding of BUM traffic in routers and/or switches (e.g., in environments such as interconnected L2 broadcast domains, such as DCs and DCIs with a VXLAN overlay) so that BUM traffic is properly forward, but with reduced (e.g., eliminated) unnecessary duplication and/or flooding.

What is claimed is:

1. A computer implemented method for use in a data forwarding device comprising:

a) receiving a packet in a Broadcast Domain (BD) including a VXLAN header, wherein the VXLAN header includes information indicating that the packet is ingress replicated Broadcast, Unknown unicast, or Multicast (BUM) traffic;

b) responsive to receiving the packet in the BD, determining, by the data forwarding device, whether any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD; and c) responsive to determining that any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD, flooding the packet in the BD, and otherwise, responsive to determining that all of (1) the data forwarding device belongs to a data center interconnect (DCI) broadcast domain (BD), (2) a MAC/IP multicast forwarding table(s) in the data forwarding device for the BD has an entry corresponding to a destination MAC/IP multicast address in the packet received, and (3) the data forwarding device is a designated forwarder (DF) for the BD, performing layer 2 (L2) unicast/IP multicast data forwarding on the packet using the entry in the MAC/IP multicast forwarding table(s).

2. The computer-implemented method of claim 1, wherein the act of determining whether or not all of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD, includes 1) Determining whether or not the data forwarding device belongs to a DCI BD or non-DCI BD;

2) Responsive to determining that the data forwarding device belongs to a non-DCI BD, flooding the packet received in the BD, and otherwise responsive to determining that the data forwarding device belongs to a DCI BD, determining, as a function of at least one of (i) whether or not a MAC/IP multicast forwarding table(s) in the data forwarding device has an entry corresponding to a destination MAC/IP multicast address in the packet received, and/or (ii) whether or not the data forwarding device is a DF or non-DF for the BD, whether to either (A) flood the packet received in the BD, or (B) perform L2/multicast IP forwarding in the BD.

3. The computer-implemented method of claim 2, wherein the act of determining, as a function of at least one of (i) whether or not a MAC/IP multicast forwarding table(s) in the data forwarding device has an entry corresponding to a destination MAC/IP multicast address in the packet received, and/or (ii) whether or not the data forwarding device is a DF or non-DF for the BD, whether to either (A) flood the packet received in the BD, or (B) perform L2/multicast IP forwarding in the BD, determining whether or not both (i) the MAC/IP multicast forwarding table(s) in the data forwarding device has an entry corresponding to a destination MAC/IP multicast address in the packet received, and (ii) the data forwarding device is the DF in the BD, and responsive to determining that both (i) the MAC/IP multicast forwarding table(s) in the data forwarding device has an entry corresponding to a destination MAC/IP multicast address in the packet received, and (ii) the data forwarding device is the DF in the BD, performing L2/Multicast IP forwarding using the entry in the MAC/IP multicast forwarding table(s), and otherwise, flooding the packet received in the BD.

4. The computer-implemented method of claim 2, wherein the act of determining, as a function of at least one of (i) whether or not a MAC/IP multicast forwarding table(s) in the data forwarding device has an entry corresponding to a destination MAC/IP multicast address in the packet received, and/or (ii) whether or not the data forwarding device is a DF or non-DF for the BD, whether to either (A) flood the packet received in the BD, or (B) perform L2/multicast IP forwarding in the BD, includes determining whether or not the MAC/IP multicast forwarding table(s) in the data forwarding device has an entry corresponding to a destination MAC/IP multicast address in the packet received, and responsive to determining that the MAC/IP multicast forwarding table(s) in the data forwarding device does not have an entry corresponding to a destination MAC/IP multicast address in the packet received, flooding the packet received in the BD, and otherwise, responsive to determining that the MAC/IP multicast forwarding table(s) in the data forwarding device has an entry corresponding to a destination MAC/IP multicast address in the packet received, further determining whether or not the data forwarding device is the DF or a non-DF for the BD, and responsive to determining that the data forwarding device is the DF for the BD, performing L2/Multicast forwarding using the entry in the MAC/IP multicast forwarding table(s), and otherwise, responsive to determining that the data forwarding device is a non-DF for the BD, flooding the packet received in the BD.

5. The computer-implemented method of claim 1, wherein the act of flooding the packet in the BD is subject to Interconnect ESI (I-ESI) filtering if the data forwarding device is a non-DF for the BD.

6. The computer-implemented method of claim 1, wherein the act of flooding the packet in the BD is subject to local bias processing.

7. The computer-implemented method of claim 1, wherein the act of flooding the packet in the BD is subject to both (1) Interconnect ESI (I-ESI) filtering if the data forwarding device is a non-DF for the BD, and (2) local bias processing.

8. The computer-implemented method of claim 3, wherein the act of flooding the packet received in the BD, is subject to Interconnect ESI (I-ESI) filtering if the data forwarding device is a non-DF for the BD.

9. The computer-implemented method of claim 3, wherein the act of flooding the packet received in the BD responsive to the determination that the data forwarding device is a non-DF for the BD, is subject to local bias processing.

10. The computer-implemented method of claim 1, wherein the data forwarding device is a router or switch belonging to a data center.

11. The computer-implemented method of claim 1, wherein the data forwarding device is a router or switch belonging to a network domain serving as a DCI.

12. The computer-implemented method of claim 1, wherein the data forwarding device is a gateway router or switch belonging to both (1) a data center, and (2) a network domain serving as a DCI interconnecting the data center with another data center.

13. The computer-implemented method of claim, 1 wherein the acts of responsive to determining that any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD, flooding the packet in the BD, includes responsive to determining (i) a MAC/IP multicast forwarding table(s) in the data forwarding device for the BD has an entry corresponding to a destination MAC/IP multicast address in the packet received, (ii) the data forwarding device belongs to a data center interconnect (DCI) broadcast domain (BD), and (iii) the data forwarding device is not a designated forwarder (DF) for the BD, flooding the packet in the BD, responsive to determining that (i) the data forwarding device belongs to a data center interconnect (DCI) broadcast domain (BD), and (ii) a MAC/IP multicast forwarding table(s) in the data forwarding device for the BD does not have an entry corresponding to a destination MAC/IP multicast address in the packet received, flooding the packet in the BD, or responsive to determining that the data forwarding device does not belong to a data center interconnect (DCI) broadcast domain (BD), flooding the packet in the BD.

14. A data forwarding device comprising:

a) at least one processor; and b) a storage system storing processor-executable instructions which, when executed by the at least one processor, perform a method including 1) Receiving a packet in a Broadcast Domain (BD) including a VXLAN header, wherein the VXLAN header includes information indicating that the packet is ingress replicated Broadcast, Unknown unicast, or Multicast (BUM) traffic, 2) responsive to receiving the packet in the BD, determining, by the data forwarding device, whether any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD, and 3) Responsive to determining that any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD, flooding the packet in the BD, and otherwise, responsive to determining that all of (1) the data forwarding device belongs to a data center interconnect (DCI) broadcast domain (BD), (2) a MAC/IP multicast forwarding table(s) in the data forwarding device for the BD has an entry corresponding to a destination MAC/IP multicast address in the packet received, and (3) the data forwarding device is a designated forwarder (DF) for the BD, performing layer 2 (L2) unicast/IP multicast data forwarding on the packet using the entry in the MAC/IP multicast forwarding table(s).

15. The data forwarding device of claim 14, wherein the act of flooding the packet in the BD is subject to Interconnect ESI (I-ESI) filtering if the data forwarding device is a non-DF for the BD.

16. The data forwarding device of claim 14, wherein the act of flooding the packet in the BD is subject to local bias processing.

17. The data forwarding device of claim 14, wherein the act of flooding the packet in the BD is subject to both (1) Interconnect ESI (I-ESI) filtering if the data forwarding device is a non-DF for the BD, and (2) local bias processing.

18. The data forwarding device of claim 14, wherein the data forwarding device is a router or switch deployed in a data center.

19. The data forwarding device of claim 14, wherein the data forwarding device is a router or switch deployed in a network domain serving as a DCI.

20. A non-transitory computer-readable medium storing computer-executable instructions which, when executed by at least one processor of a data forwarding device, cause the data forwarding device to perform a method comprising:

a) receiving a packet in a Broadcast Domain (BD) including a VXLAN header, wherein the VXLAN header includes information indicating that the packet is ingress replicated Broadcast, Unknown unicast, or Multicast (BUM) traffic;

b) responsive to receiving the packet in the BD, determining, by the data forwarding device, whether any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD; and c) responsive to determining that any of (1) the data forwarding device does not belong to a data center interconnect (DCI) broadcast domain (BD), (2) a MAC/IP multicast forwarding table(s) in the data forwarding device for the BD does not have an entry corresponding to a destination MAC/IP multicast address in the packet received, or (3) the data forwarding device is not a designated forwarder (DF) for the BD, flooding the packet in the BD, and otherwise, responsive to determining that all of (1) the data forwarding device belongs to a data center interconnect (DCI) broadcast domain (BD), (2) a MAC/IP multicast forwarding table(s) in the data forwarding device for the BD has an entry corresponding to a destination MAC/IP multicast address in the packet received, and (3) the data forwarding device is a designated forwarder (DF) for the BD, performing layer 2 (L2) unicast/IP multicast data forwarding on the packet using the entry in the MAC/IP multicast forwarding table(s).

* * * * *